US012030305B2

(12) United States Patent
Sasaki et al.

(10) Patent No.: US 12,030,305 B2
(45) Date of Patent: Jul. 9, 2024

(54) RECORDING APPARATUS

(71) Applicant: SEIKO EPSON CORPORATION, Tokyo (JP)

(72) Inventors: Keisuke Sasaki, Matsumoto (JP); Shinji Kanemaru, Matsumoto (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/182,262

(22) Filed: Mar. 10, 2023

(65) Prior Publication Data

US 2023/0226831 A1 Jul. 20, 2023

Related U.S. Application Data

(62) Division of application No. 17/093,108, filed on Nov. 9, 2020, now Pat. No. 11,613,135.

(30) Foreign Application Priority Data

Nov. 11, 2019 (JP) ................................ 2019-203776
Jun. 2, 2020 (JP) ................................ 2020-095923

(51) Int. Cl.
*B41J 11/04* (2006.01)
*B65H 5/06* (2006.01)

(52) U.S. Cl.
CPC ............... *B41J 11/04* (2013.01); *B65H 5/062* (2013.01)

(58) Field of Classification Search
CPC ........ B41J 11/04; B41J 11/0045; B41J 13/10; B41J 13/103; B41J 13/009; B41J 3/60; B41J 13/00; B41J 13/02; B41J 2/01; B65H 5/062; B65H 5/06; B65H 3/06; B65H 85/00
See application file for complete search history.

(56) References Cited

U.S. PATENT DOCUMENTS

| | | | | |
|---|---|---|---|---|
| 9,956,795 B2 | 5/2018 | Ogimura | | |
| 2007/0109385 A1 | 5/2007 | Imoto | | |
| 2009/0184466 A1 | 7/2009 | Maeda | | |
| 2011/0309564 A1* | 12/2011 | Samoto | .................... | B41J 13/02 271/3.19 |
| 2012/0206552 A1 | 8/2012 | Uchino | | |
| 2012/0242029 A1 | 9/2012 | Nada | | |
| 2013/0002780 A1 | 1/2013 | Miyashita | | |
| 2015/0054897 A1 | 2/2015 | Ito | | |

(Continued)

FOREIGN PATENT DOCUMENTS

| | | |
|---|---|---|
| CN | 107020835 | 8/2017 |
| JP | 2001-097577 | 4/2001 |

(Continued)

*Primary Examiner* — John Zimmermann
(74) *Attorney, Agent, or Firm* — WORKMAN NYDEGGER

(57) ABSTRACT

A recording apparatus including a recording head that performs recording, a feed roller that feeds out a set medium, a transport driving roller that transports the medium, which is fed out by the feed roller, towards an opposing position that opposes the recording head, and an auxiliary roller provided between the feed roller and the transport driving roller, the auxiliary roller assisting transportation of the medium. When the apparatus is seen from a side of the apparatus, the auxiliary roller overlaps the feed roller in a height direction of the apparatus.

10 Claims, 21 Drawing Sheets

(56) References Cited

U.S. PATENT DOCUMENTS

| | | | | |
|---|---|---|---|---|
| 2018/0034987 | A1 | 2/2018 | Yamauchi | |
| 2018/0056677 | A1 | 3/2018 | Hara | |
| 2018/0282085 | A1 | 10/2018 | Kinoshita | |
| 2018/0345692 | A1 | 12/2018 | Shomura et al. | |
| 2019/0160835 | A1* | 5/2019 | Sumii | B41J 11/04 |
| 2020/0001628 | A1* | 1/2020 | Sumii | B41J 11/42 |
| 2020/0324559 | A1 | 10/2020 | Sumii | |

FOREIGN PATENT DOCUMENTS

| | | | |
|---|---|---|---|
| JP | 2005-247434 | | 9/2005 |
| JP | 2011-063035 | A | 3/2011 |
| JP | 5218793 | | 6/2013 |
| JP | 2018-019332 | | 2/2018 |
| JP | 2018-019340 | | 2/2018 |
| JP | 2019-064748 | A | 4/2019 |
| JP | 2020-007125 | | 1/2020 |
| JP | 2020-172360 | | 10/2020 |
| JP | 2020-175966 | | 10/2020 |

* cited by examiner

RECORDING APPARATUS

This application is a divisional application of U.S. patent application Ser. No. 17/093,108, filed Nov. 9, 2020, which claims the benefit of and priority to JP Application Serial Number 2019-203776, filed Nov. 11, 2019, and JP Application Serial Number 2020-095923, filed Jun. 2, 2020, the disclosures of which are hereby incorporated by reference herein in their entirety.

BACKGROUND

1. Technical Field

The present disclosure relates to a recording apparatus.

2. Related Art

Hitherto, a recording apparatus that transports a set medium towards an opposing position that opposes a recording head and that performs recording with the recording head has been used. For example, JP-A-2018-19332 discloses an image reading apparatus that transports a sheet set in a feed tray towards a printer portion. In such recording apparatuses, there is a recording apparatus that feeds out a set medium towards a transport roller that transports the medium to an opposing position that opposes a recording head, that causes the transport roller to transport the medium, and that performs recording with the recording head.

JP-A-2001-097577 presents a recording apparatus that sends a medium to a feed position with a transport roller after abutting the medium against the transport roller with a feed roller to perform skew removal.

In the recording apparatus that feeds out the set medium towards the transport roller that transports the medium to the opposing position that opposes the recording head, that causes the transport roller to transport the medium, and that performs recording with the recording head, there are cases in which a transport failure of the medium occurs when feeding out the set medium. For example, by increasing the number of rollers that transport the medium by additionally providing an auxiliary roller and the like, the transport failure of the medium can be reduced; however, the apparatus becomes large. For example, in the image reading apparatus in JP-A-2018-19332, while not described specifically, it is seen in the drawings that a plurality of rollers is provided in a sheet transport path from the feed tray to the printer portion. Such an arrangement of the rollers increases the size of the apparatus.

SUMMARY

A recording apparatus of the present disclosure that overcomes the issues described above includes a recording head that performs recording, a feed roller that feeds out a set medium, a transport roller that transports the medium, which is fed out by the feed roller, towards an opposing position that opposes the recording head, and an auxiliary roller provided between the feed roller and the transport roller, the auxiliary roller assisting transportation of the medium. In the recording apparatus, when the apparatus is seen from a side of the apparatus, the auxiliary roller overlaps the feed roller in a height direction of the apparatus.

Furthermore, a recording apparatus of the present disclosure includes a recording head that performs recording, a transport roller that transports a medium towards an opposing position that opposes the recording head, an inversion path provided on a side opposite the recording head with respect to the transport roller, the inversion path inverting the medium, and an auxiliary roller provided between the inversion path and the transport roller, the auxiliary roller assisting the transportation of the medium. In the recording apparatus, when the apparatus is seen from a side of the apparatus, the auxiliary roller, in a height direction of the apparatus, overlaps a center position of the inversion path in the height direction.

Furthermore, a recording apparatus of the present disclosure includes a recording head that performs recording on a medium, a feed roller that feeds out a set medium, a nip portion that nips the medium together with the feed roller, and a pair of transport rollers that transports the medium, which is fed out by the feed roller, towards an opposing position that opposes the recording head. In the recording apparatus, a maximum value Lmax of a feeding length of the medium fed by the feed roller is less than a path length L3 that is a sum of a path length L1 from a first nip position at which the medium is nipped by the feed roller and the nip portion to a second nip position at which the medium is nipped by the pair of transport rollers, and a path length L2 from the second nip position to a most upstream position in a transport direction in a recordable range of the recording head.

Figure 7:
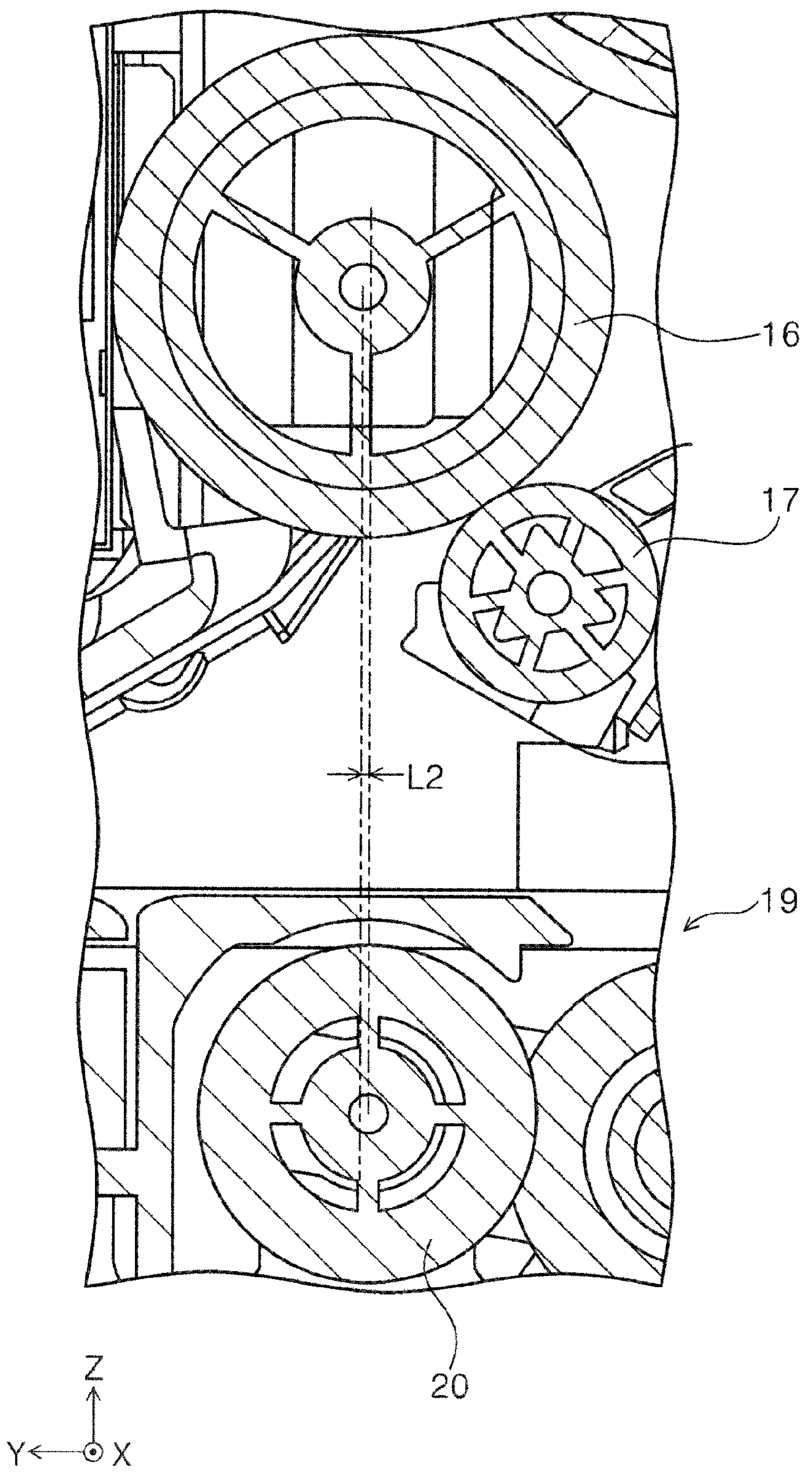

The FIG. 7 is a side sectional view illustrating a positional relationship between the auxiliary roller and a pick-unit pivot shaft of the recording apparatus according to the first exemplary embodiment of the present disclosure.

Figure 8:
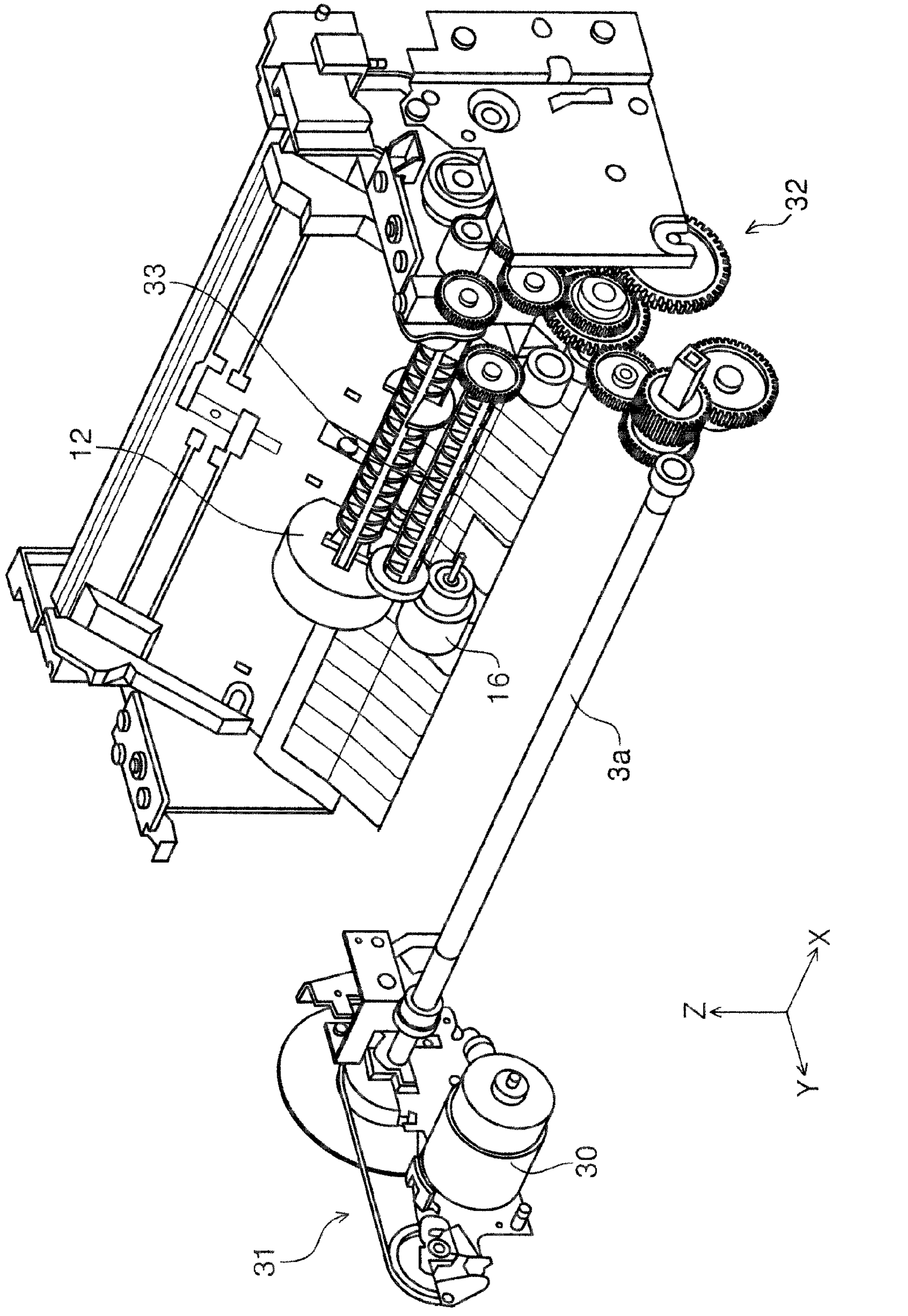

FIG. 8 is a perspective view illustrating an internal configuration including a motor and a driving wheel train of the recording apparatus according to the first exemplary embodiment of the present disclosure.

Figure 9:
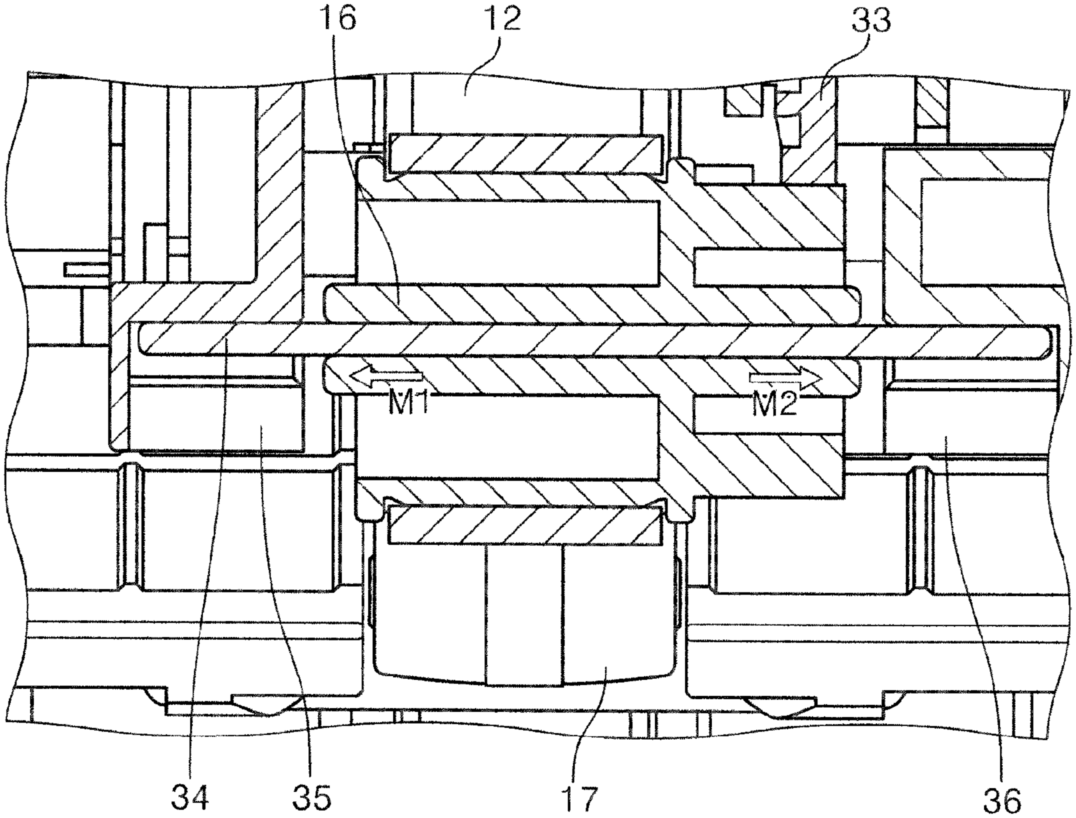

FIG. 9 is a front sectional view of the auxiliary roller of the recording apparatus according to the first exemplary embodiment of the present disclosure.

Figure 10:
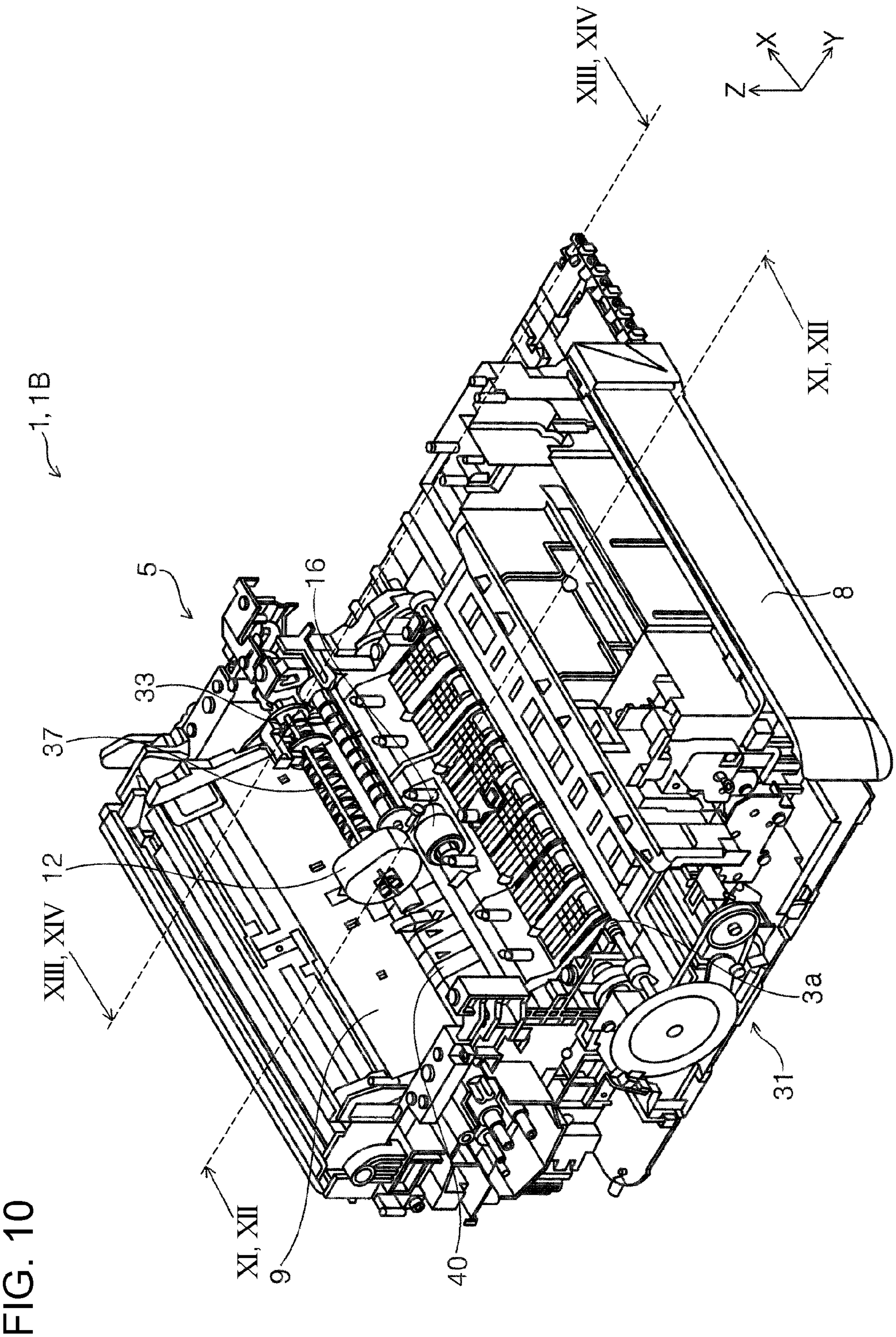

FIG. 10 is a perspective view illustrating an internal configuration of a recording apparatus according to a second exemplary embodiment of the present disclosure.

Figure 11:
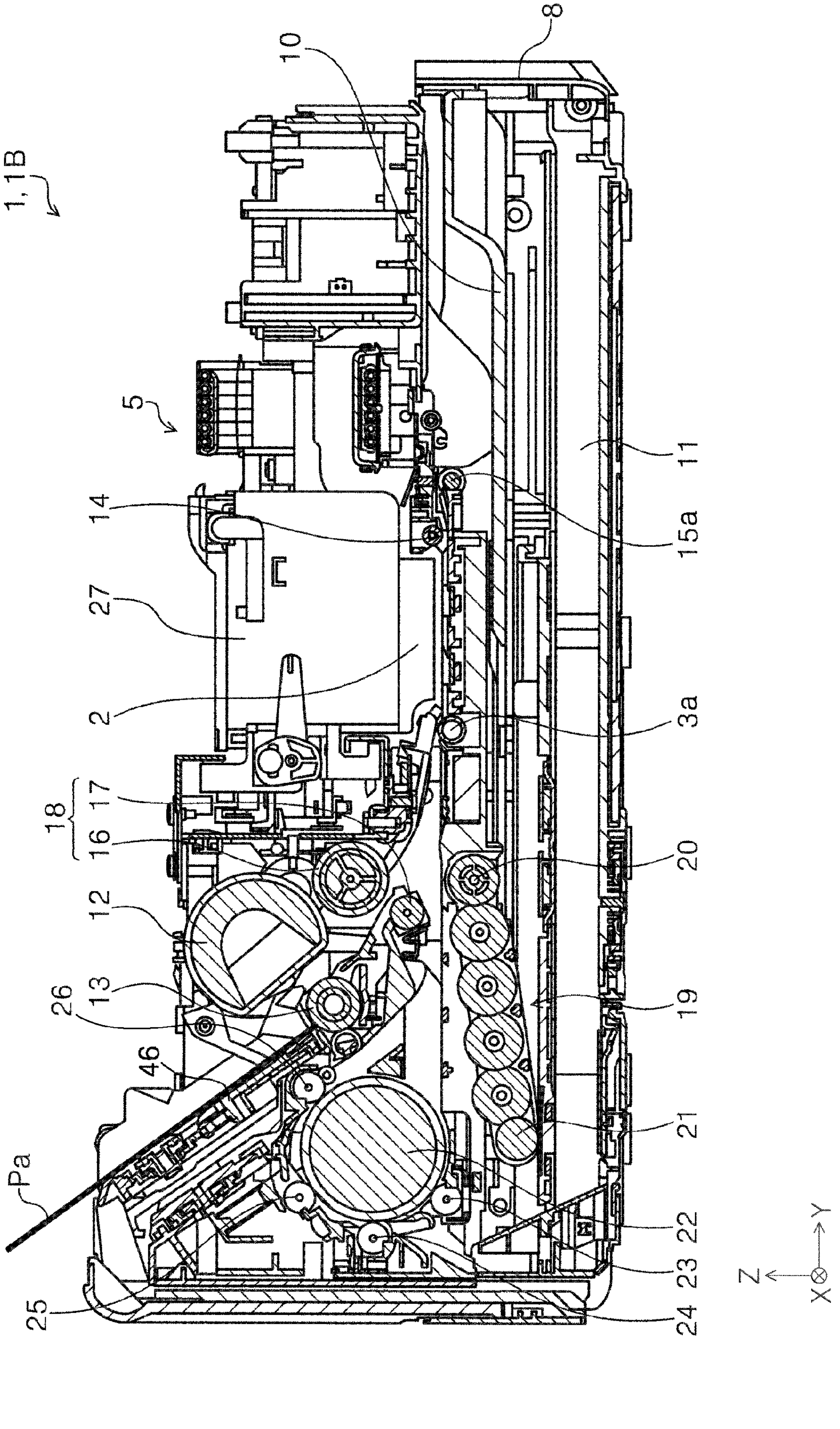

FIG. 11 is a cross-sectional view of the recording apparatus in FIG. 10 taken along line XI, XII-XI, XII, and is a diagram illustrating a state in which a medium is not pinched between the feed roller and the auxiliary roller.

Figure 12:
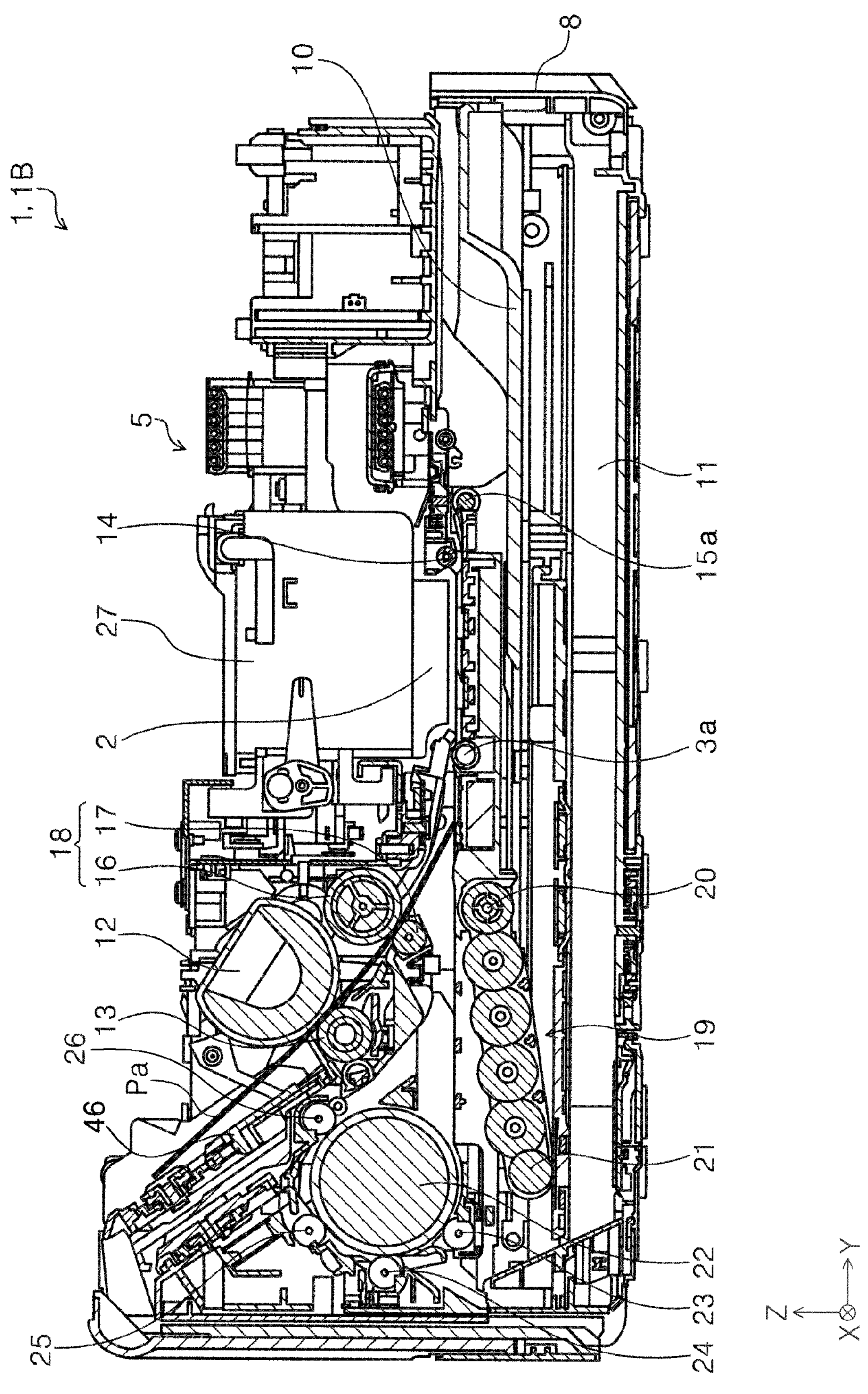

FIG. 12 is a cross-sectional view of the recording apparatus in FIG. 10 taken along line XI, XII-XI, XII, and is a diagram illustrating a state in which a medium is pinched between the feed roller and the auxiliary roller.

Figure 13:
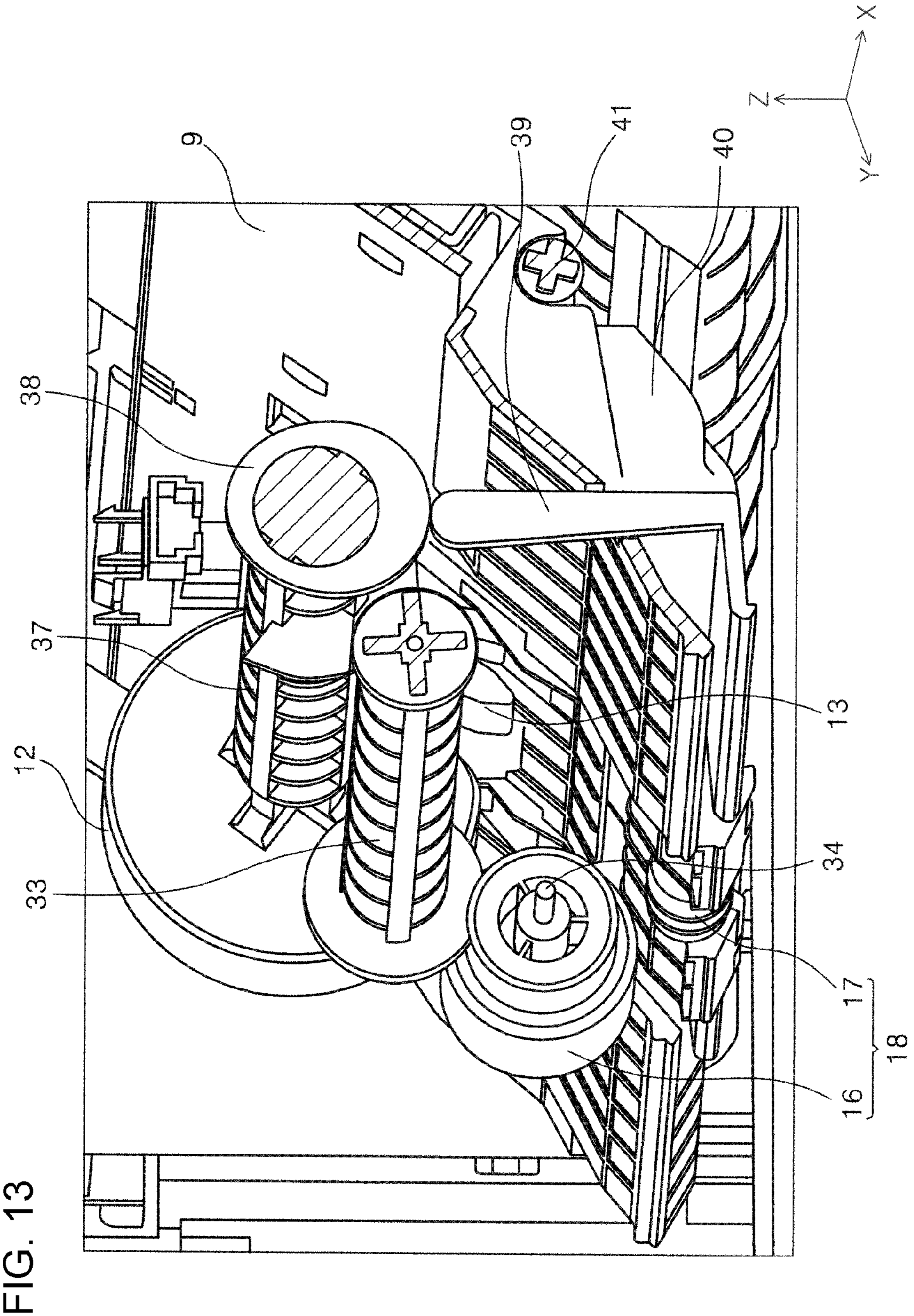

FIG. 13 is a cross-sectional view around the feed roller and the auxiliary roller of the recording apparatus in FIG. 10 taken along line XIII, XIV-XIII, XIV, and illustrates a state in which the medium is not pinched between the feed roller and the auxiliary roller.

Figure 14:
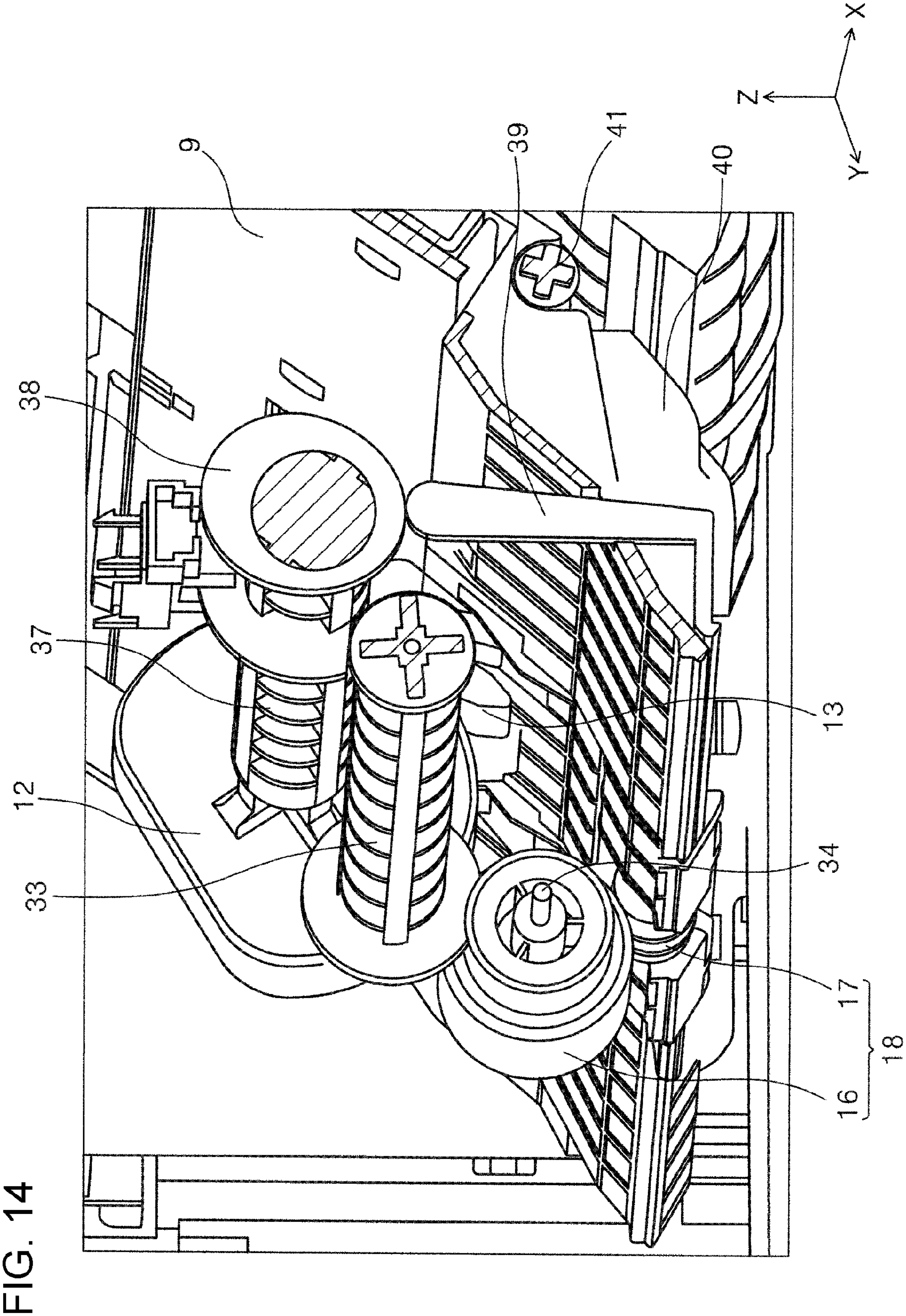

FIG. 14 is a cross-sectional view around the feed roller and the auxiliary roller of the recording apparatus in FIG. 10 taken along line XIII, XIV-XIII, XIV, and illustrates a state in which the medium is pinched between the feed roller and the auxiliary roller.

Figure 15:
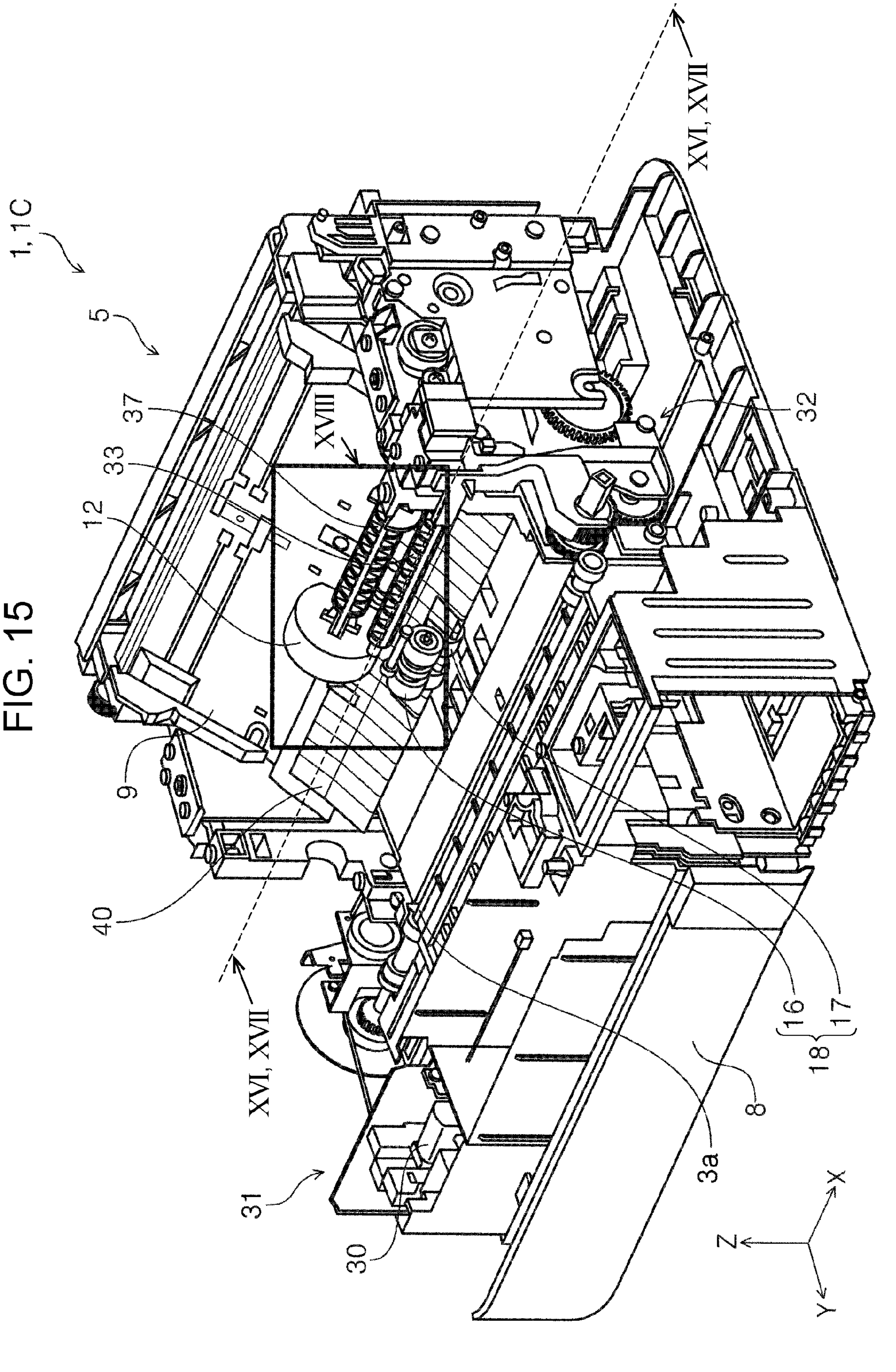

FIG. 15 is a perspective view illustrating an internal configuration of a recording apparatus according to a third exemplary embodiment of the present disclosure.

Figure 16:
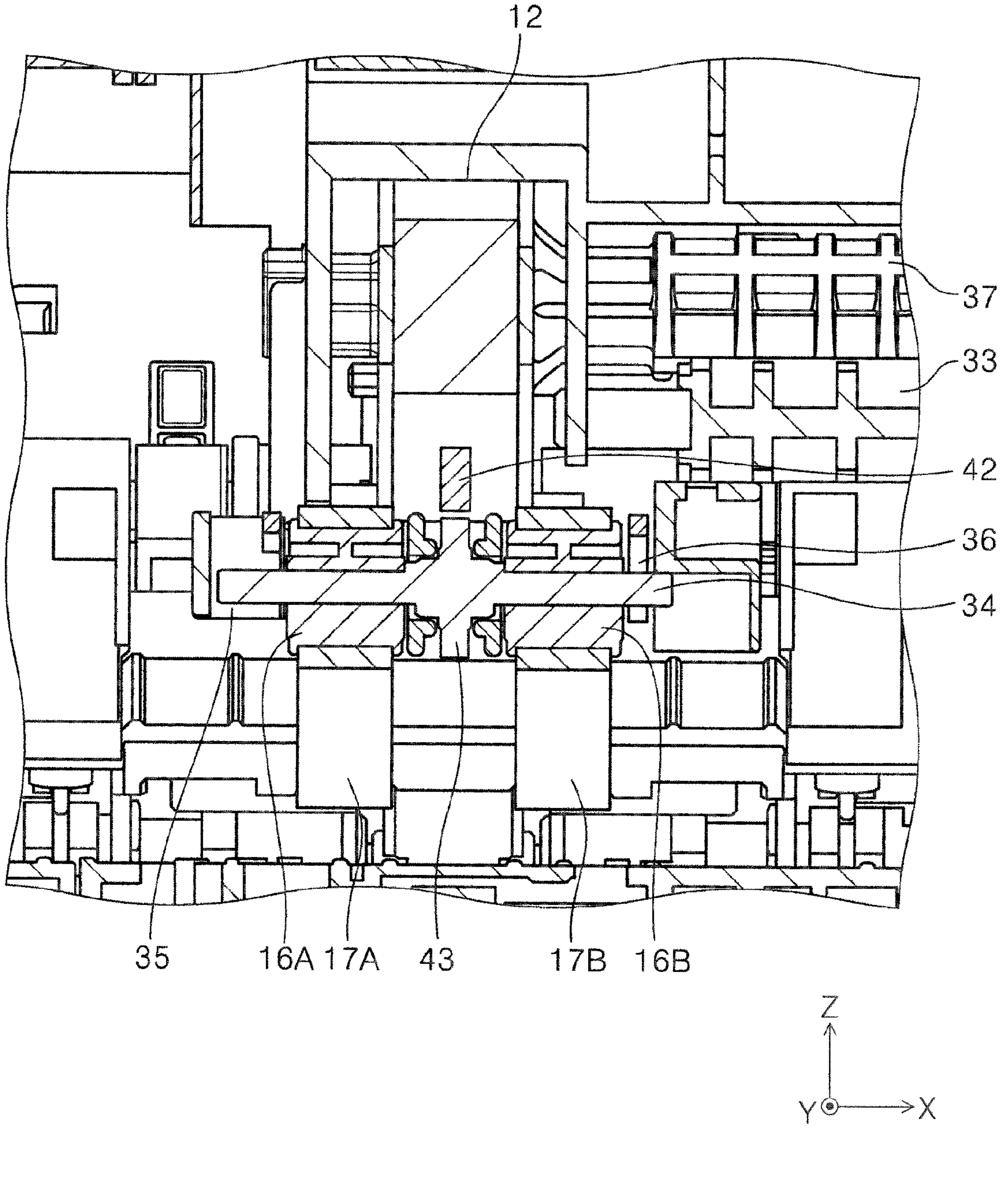

FIG. 16 is a cross-sectional view of the auxiliary roller of the recording apparatus in FIG. 15 taken along line XVI, XVII-XVI, XVII, and is a diagram illustrating a state in which the auxiliary roller is in a horizontal state and at a position pinching the medium.

Figure 17:
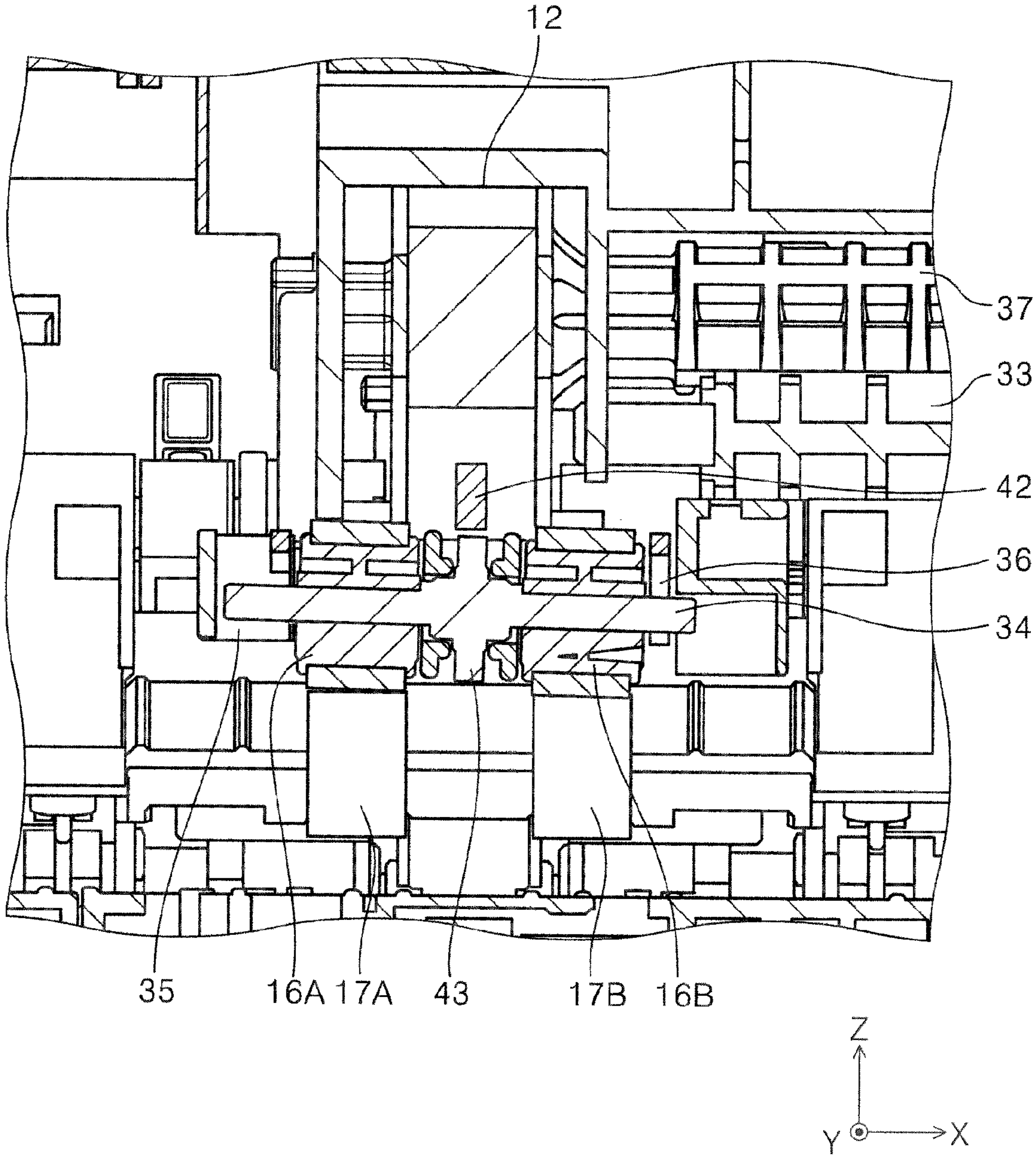

FIG. 17 is a cross-sectional view of the auxiliary roller of the recording apparatus in FIG. 15 taken along line XVI, XVII-XVI, XVII, and is a diagram illustrating a state in which the auxiliary roller inclined with respect to a horizontal state is at a position pinching the medium.

Figure 18:
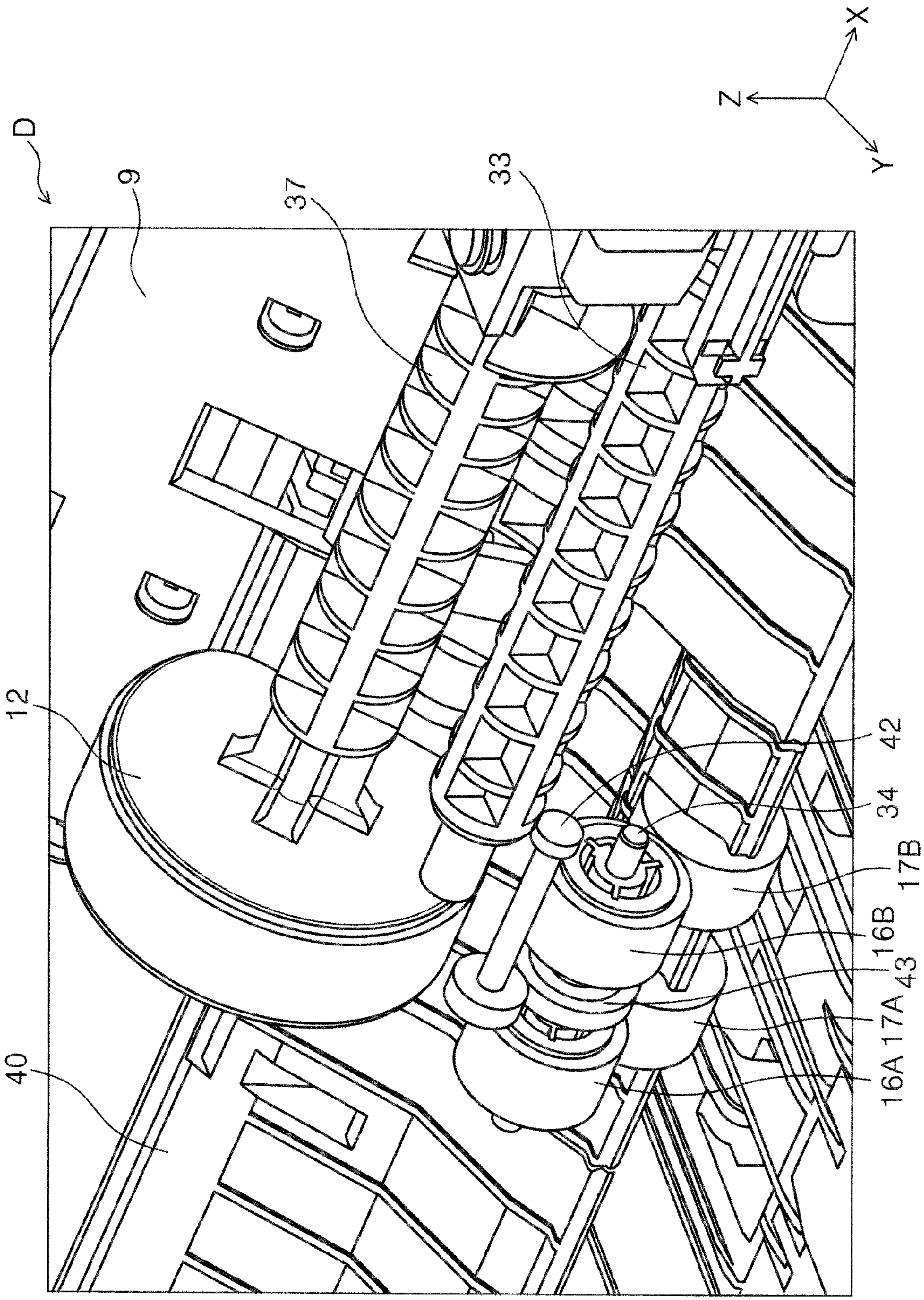

FIG. 18 is an enlarged view illustrating an area XVIII of the recording apparatus in FIG. 15.

Figure 19:
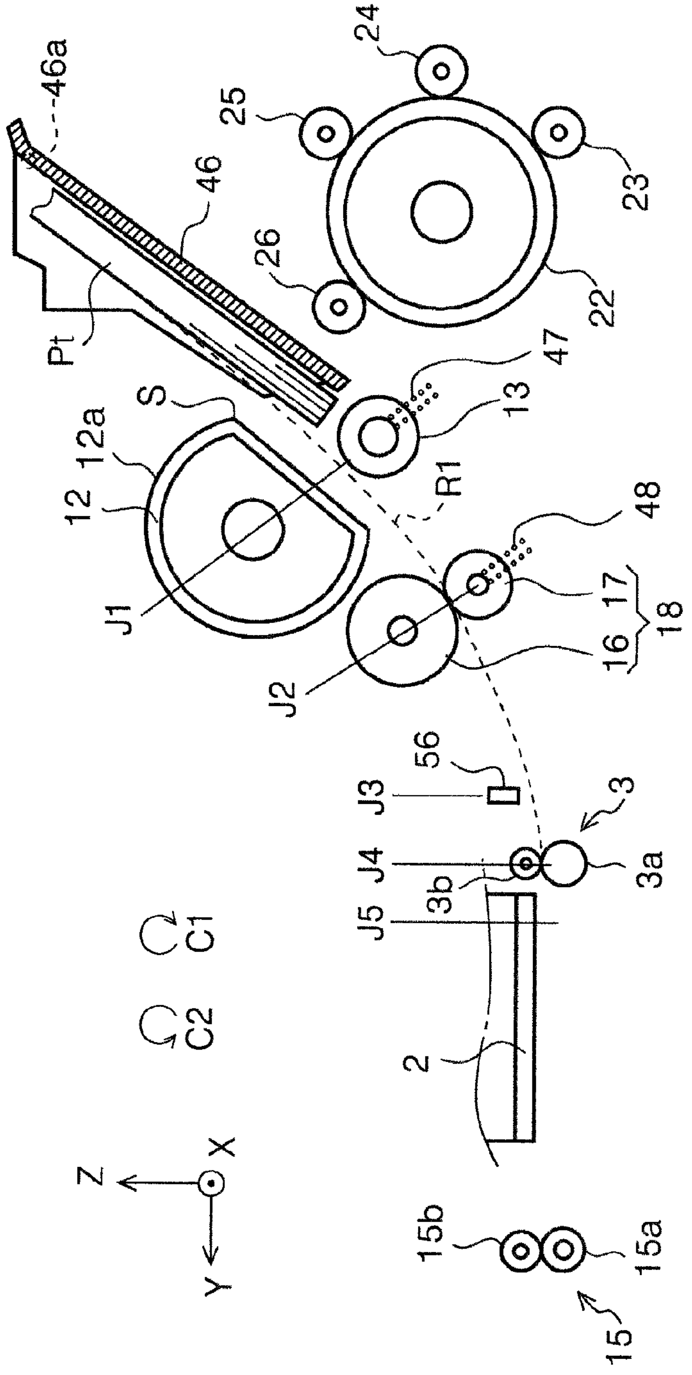

FIG. 19 is a diagram schematically illustrating a transport path of the medium in the recording apparatus.

Figure 20:
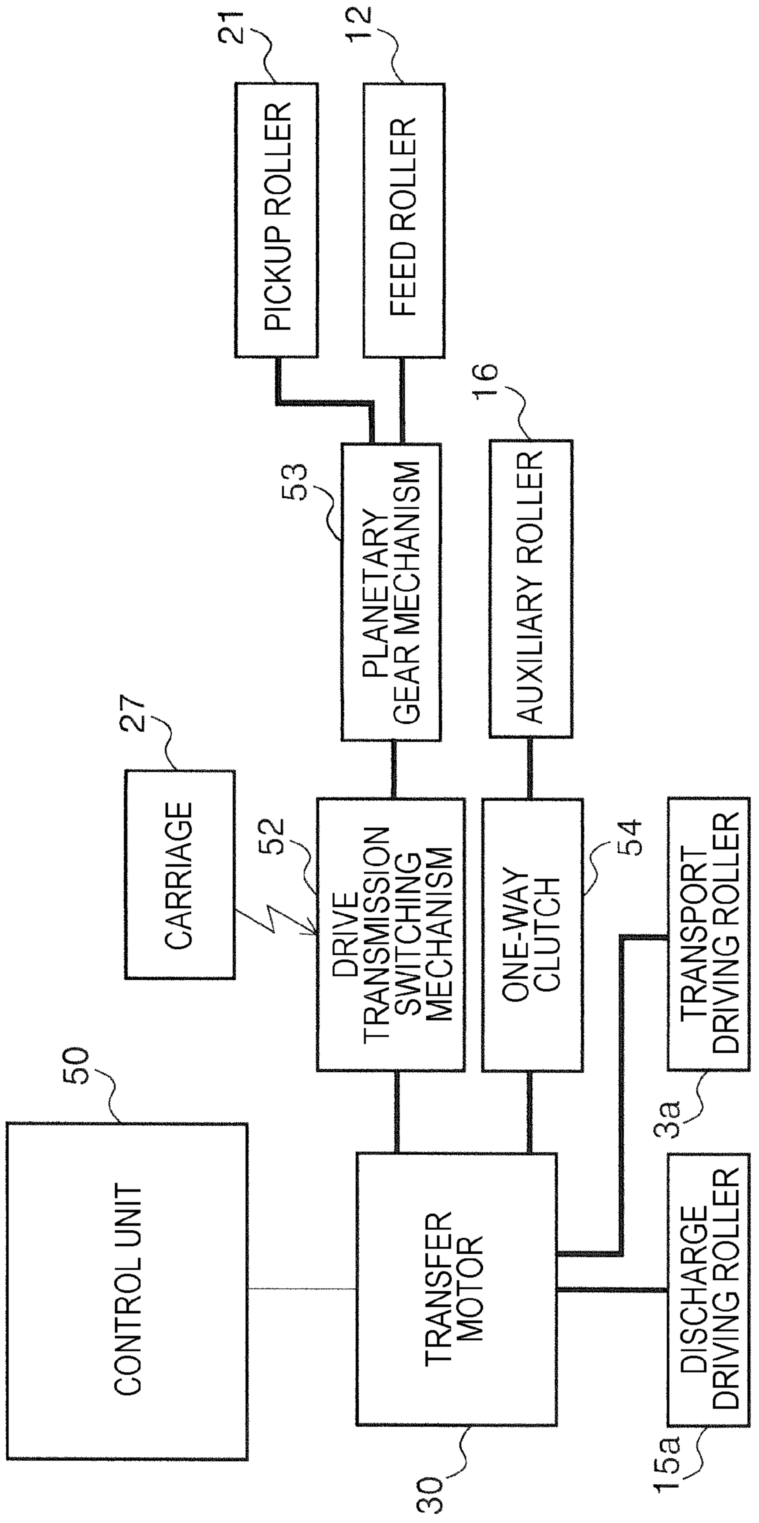

FIG. 20 is a block diagram functionally illustrating a configuration of a power transmission path between a transport motor and each roller.

Figure 21:
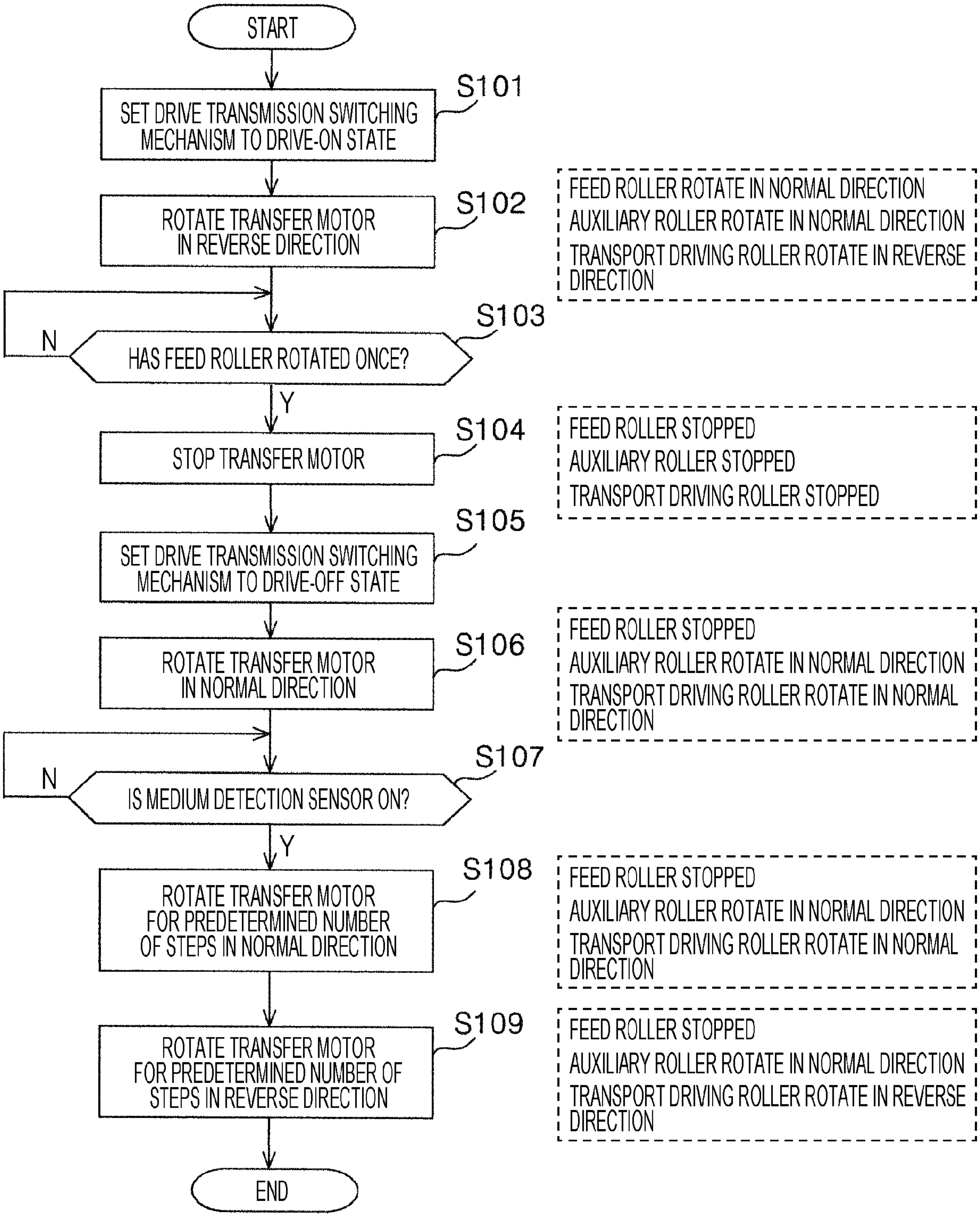

FIG. 21 is a flow chart illustrating control of the transport motor during feeding of the medium.

DESCRIPTION OF EXEMPLARY EMBODIMENTS

An outline of the present disclosure will be described first.

A recording apparatus of a first aspect includes a recording head that performs recording, a feed roller that feeds out a set medium, a transport roller that transports the medium, which is fed out by the feed roller, towards an opposing position that opposes the recording head, and an auxiliary roller provided between the feed roller and the transport roller, the auxiliary roller assisting transportation of the medium. When the apparatus is seen from a side of the apparatus, the auxiliary roller overlaps the feed roller in a height direction of the apparatus.

According to the present aspect, since the auxiliary roller that assists the transportation of the medium is included between the feed roller and the transport roller, the transport failure of the medium can be suppressed, and by disposing, in side view, the auxiliary roller to overlap the feed roller in the height direction, an increase in the size of the apparatus can be suppressed.

In a second aspect of the recording apparatus according to the first aspect, in side view, the auxiliary roller overlaps the feed roller in a depth direction of the apparatus.

According to the present aspect, when the apparatus is seen from side of the apparatus, since the auxiliary roller overlaps the feed roller not only in the height direction but also in the depth direction, an increase in the size of the apparatus can be suppressed in a particularly effective manner.

In a third aspect of the recording apparatus according to the first or second aspect, when the apparatus is seen from a front of the apparatus, the auxiliary roller overlaps the feed roller in an axial direction of a rotation shaft of the transport roller.

According to the present aspect, in front view, since the auxiliary roller overlaps the feed roller not only in the height direction but also in the axial direction of the rotation shaft of the transport roller, an increase in the size of the apparatus can be suppressed in a particularly effective manner.

A recording apparatus according to a fourth aspect includes a recording head that performs recording, a transport roller that transports a medium towards an opposing position that opposes the recording head, an inversion path provided on a side opposite the recording head with respect to the transport roller, the inversion path inverting the medium, and an auxiliary roller provided between the inversion path and the transport roller, the auxiliary roller assisting the transportation of the medium. In the recording apparatus, when the apparatus recording is seen from a side of the apparatus, the auxiliary roller, in a height direction of the apparatus, overlaps a center position of the inversion path in the height direction.

According to the present aspect, since the auxiliary roller that assists the transportation of the medium is included between the inversion path and the transport roller, the transport failure of the medium can be suppressed, and an increase in the size of the apparatus can be suppressed by disposing the auxiliary roller, in side view, to overlap, in the height direction of the apparatus, the center position of the inversion path in the height direction.

A fifth aspect of the recording apparatus according to the fourth aspect further includes an inverting roller provided inside the inversion path, the inverting roller rotating to move the medium in the inversion path. In the recording apparatus, a position of a rotation shaft of the inverting roller is a center position of the inversion path.

According to the present aspect, the inversion path can be formed easily by using the inverting roller in which the rotation shaft is disposed at the center position of the inversion path.

A sixth aspect of the recording apparatus according to the fourth or fifth aspect further includes a feed roller that feeds out a set medium. In the recording apparatus, the transport roller transports the medium, which is fed out by the feed roller, towards the opposing position, the auxiliary roller is provided between the feed roller and the transport roller, and when the apparatus is seen from the side of the apparatus, the auxiliary roller overlaps the feed roller in the height direction.

According to the present aspect, an increase in the size of the apparatus is suppressed by, in side view, disposing the auxiliary roller to overlap the feed roller in the height direction and, in side view, disposing the auxiliary roller to overlap, in the height direction of the apparatus, the center position of the inversion path in the height direction.

In a seventh aspect of the recording apparatus according to the sixth aspect, when the apparatus is seen from the side of the apparatus, the auxiliary roller overlaps the feed roller in a depth direction of the apparatus.

According to the present aspect, in side view, since the auxiliary roller overlaps the feed roller not only in the height direction but also in the depth direction, an increase in the size of the apparatus can be suppressed in a particularly effective manner.

In an eighth aspect of the recording apparatus according to the sixth or seventh aspect, when the apparatus is seen from a front of the apparatus, the auxiliary roller overlaps the feed roller in an axial direction of a rotation shaft of the transport roller.

According to the present aspect, in front view, since the auxiliary roller overlaps the feed roller not only in the height direction but also in the axial direction of the rotation shaft of the transport roller, an increase in the size of the apparatus can be suppressed in a particularly effective manner.

A recording apparatus according to a ninth aspect includes a recording head that performs recording on a medium, a feed roller that feeds out a set medium, a nip portion that nips the medium together with the feed roller, and a pair of transport rollers that transports the medium, which is fed out by the feed roller, towards an opposing position that opposes the recording head. In the recording apparatus, a maximum value Lmax of a feeding length of the medium fed by the feed roller is less than a path length L3 that is a sum of a path length L1 from a first nip position at which the medium is nipped by the feed roller and the nip portion to a second nip position of the medium at which is nipped by the pair of transport rollers, and a path length L2 from the second nip position to a most upstream position in a transport direction in a recordable range of the recording head.

According to the present aspect, the maximum value Lmax of the feeding length of the medium with the feed roller is under the path length L3 that is the sum of a path length L1 from the nip position of the medium between the feed roller and the nip portion to the nip position of the medium between the pair of transport rollers, and the path length L2 from the nip position of the medium between the pair of transport rollers to the most upstream position in the transport direction in the recordable range of the recording head; accordingly, jamming of the medium at the opposing position that opposes the recording head can be suppressed when feeding the medium. Additionally, by reducing the size of the feed roller, the size of the entire apparatus can be reduced.

A tenth aspect according to the ninth aspect further includes an auxiliary roller that is provided between the feed roller and the pair of transport rollers and that assists the transportation of the medium. When the apparatus is seen from a side of the apparatus, the auxiliary roller overlaps the feed roller in a depth direction of the apparatus.

According to the present aspect, since the auxiliary roller that assists the transportation of the medium is included between the feed roller and the transport roller, the transport failure of the medium can be suppressed, and by disposing, in side view, the auxiliary roller to overlap the feed roller in the height direction, an increase in the size of the apparatus can be suppressed.

An eleventh aspect of the according to the tenth aspect further includes a medium detection member that detects the passage of the medium and that is provided between the auxiliary roller and the pair of transport rollers. In the eleventh aspect, the maximum value Lmax is less than a path length L4 from the first nip position to a position at which the medium detection member detects the medium.

When, after the front end of the medium has passed the medium detection member, the rotation direction of a motive power source of the feed roller is switched due to some sort of control, there will be an error between the position of the front end of the medium identified by the control member of the apparatus and the actual position of the front end of the medium due to a backlash and the like in the engagement of the gears. Normally, such an error can be corrected by detecting the front end of the medium with the medium detection member; however, if, after the feeding operation of the medium with the feed roller has ended, the front end of the medium has passed the medium detection member, the correction cannot be made. In such a case, in order to identify an accurate position of the front end of the medium, the medium needs to be fed back and the front end of the medium needs to be returned to a portion upstream of the medium detection member, which causes damage and wrinkles in the medium and causes jamming to occur.

However, according to the present aspect, since the maximum value Lmax is under the path length L4 from the nip position of the medium between the feed roller and the nip portion to the position where the medium detection member detects the medium, such an issue can be averted.

A twelfth aspect according to the eleventh aspect further includes a transport motor that is configured to generate driving force of the feed roller, the auxiliary roller and a transport driving roller that is a driving roller of the pair of the transport rollers. In the twelfth aspect, with rotation of the transport motor in a normal direction, the transport driving roller rotates and feeds out the medium downstream in the transport direction, and with rotation of the transport motor in a reverse direction, the transport driving roller rotates and feeds out the medium upstream in the transport direction, a planetary gear mechanism is provided in a transmission path of the driving force from the transport motor to the feed roller, the planetary gear mechanism being configured to switch between transmitting the driving force to the feed roller when the transport motor is rotating in the reverse direction and not transmitting the driving force of the transport motor when the transport motor is rotating in the normal direction, the feed roller, with the rotation of the transport motor in the reverse direction, rotating in a normal direction that is a rotation direction that feeds out the medium downstream in the transport direction, and a rotation restricting member is provided in a transmission path of the driving force from the transport motor to the auxiliary roller and restricts rotation of the auxiliary roller. With the rotation of the transport motor in the normal direction, the auxiliary roller rotates and feeds out the medium downstream in the transport direction. With the rotation of the transport motor in the reverse, the auxiliary roller does not rotate.

The configuration of the present aspect can obtain the advantageous effect of the eleventh aspect described above.

A thirteenth aspect according to the twelfth aspect further includes a control member that controls the transport motor. In the thirteenth aspect, the control member is configured to perform a feeding mode including a step of feeding a set medium with the feed roller by rotating the transport motor in the reverse direction, a step of nipping a front end of the medium between the pair of transport rollers by rotating the transport motor in the normal direction, and a step of discharging the front end of the medium upstream of the pair of transport rollers in the transport direction.

The present aspect can obtain the advantageous effect of the eleventh aspect described above.

A fourteenth aspect according to any one of the tenth to thirteenth aspects further includes a driven roller that nips the medium together with the auxiliary roller, a first pressing member that presses the nip portion towards the feed roller, and a second pressing member that presses the driven roller towards the auxiliary roller, the second pressing member being a member separate from the first pressing member.

The present aspect includes the first pressing member that presses the nip portion towards the feed roller, and the second pressing member that presses the driven roller towards the auxiliary roller, in which the second pressing member is a member separate from the first pressing member; accordingly, even when the pressing force of the second pressing member is increased and the transporting force is increased, the force nipping the medium between the feed roller and the nip portion does not become large, and multi feeding can be suppressed. In other words, suppressing of multi feeding and reliable transportation of the medium can both be achieved.

First Exemplary Embodiment

Referring hereinafter to the drawings, a recording apparatus according to an exemplary embodiment will be described. A recording apparatus 1A of a first exemplary embodiment illustrated in FIGS. 1 to 9 is an ink jet printer that performs recording on a medium by discharging ink from a recording head 2. An example of the medium includes a sheet member such as a recording sheet. In the X-Y-Z coordinate system illustrated in each drawing, the Y-axis direction indicates the apparatus depth direction, the X-axis direction indicates the apparatus width direction, and the Z-axis direction indicates the apparatus height direction. Note that as illustrated in FIG. 5, the X-axis direction corresponds to an axial direction of a rotation shaft of each of the various rollers such as a transport driving roller 3*a*, the Y-axis direction corresponds to a discharge direction of the medium, and the Z-axis direction corresponds to an opposing direction at an opposing position P1 where the medium and the recording head 2 oppose each other.

Schematic Configuration of Recording Apparatus

Referring first to FIGS. 1 to 5, a schematic configuration of the recording apparatus 1A will be described. As illustrated in FIG. 5, the recording apparatus 1A includes, in addition to a recording unit 5 that performs recording on a medium, a reading unit 6 configured to read an image on a medium. However, the present disclosure is not limited to a configuration that includes the reading unit 6.

Figure 1:
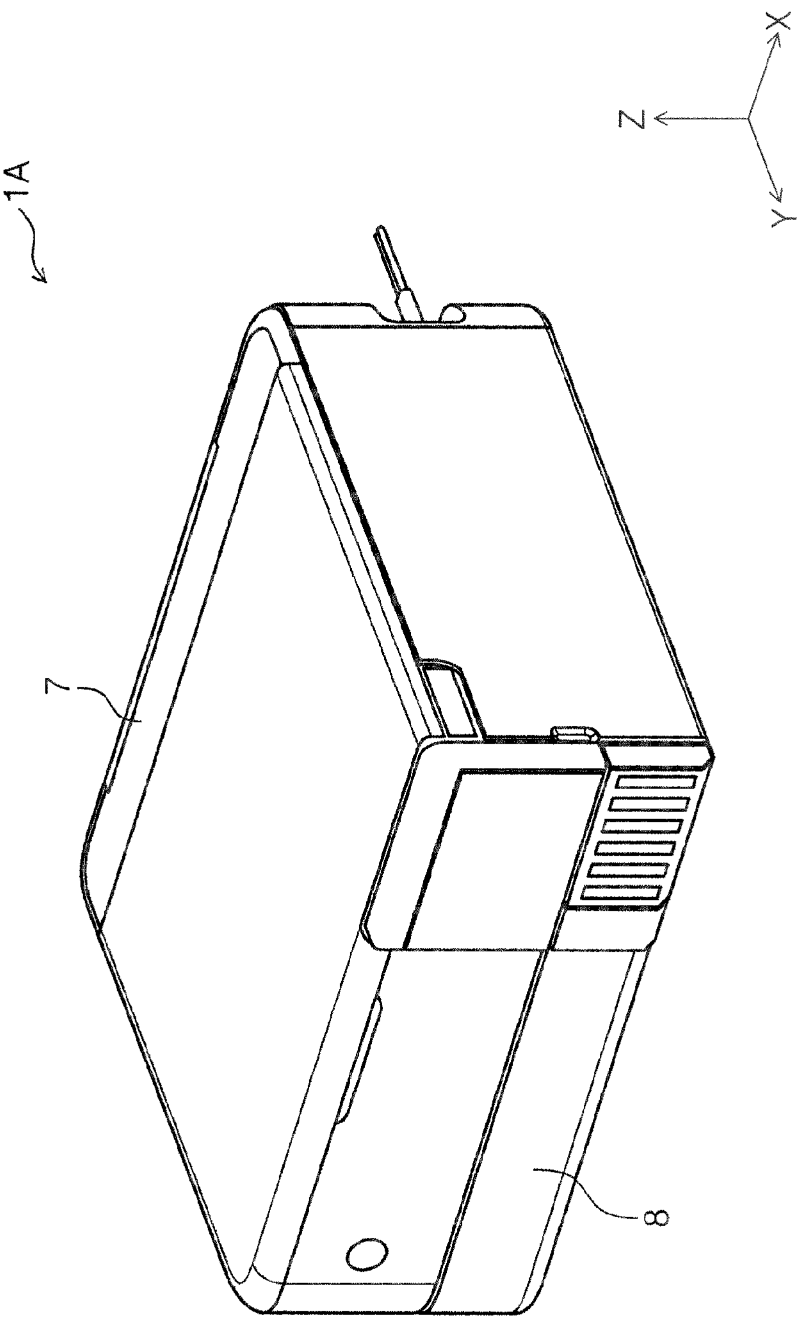
FIG. 1 is a perspective view of a recording apparatus according to a first exemplary embodiment of the present disclosure.
Figure 2:
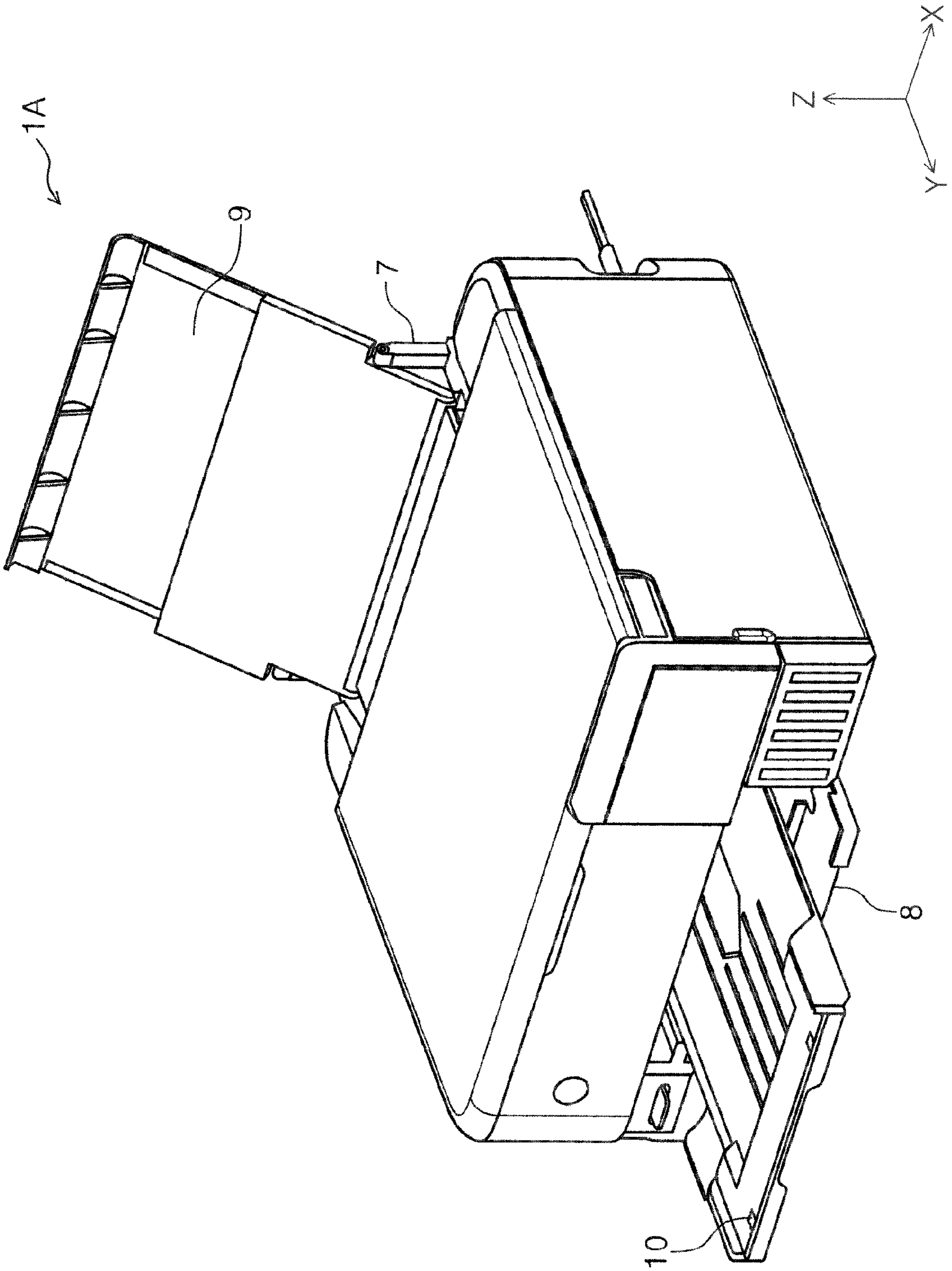
FIG. 2 is a perspective view of the recording apparatus according to the first exemplary embodiment of the present disclosure, and is a diagram illustrating a state when an auto feeder on a rear side is used.
Figure 3:
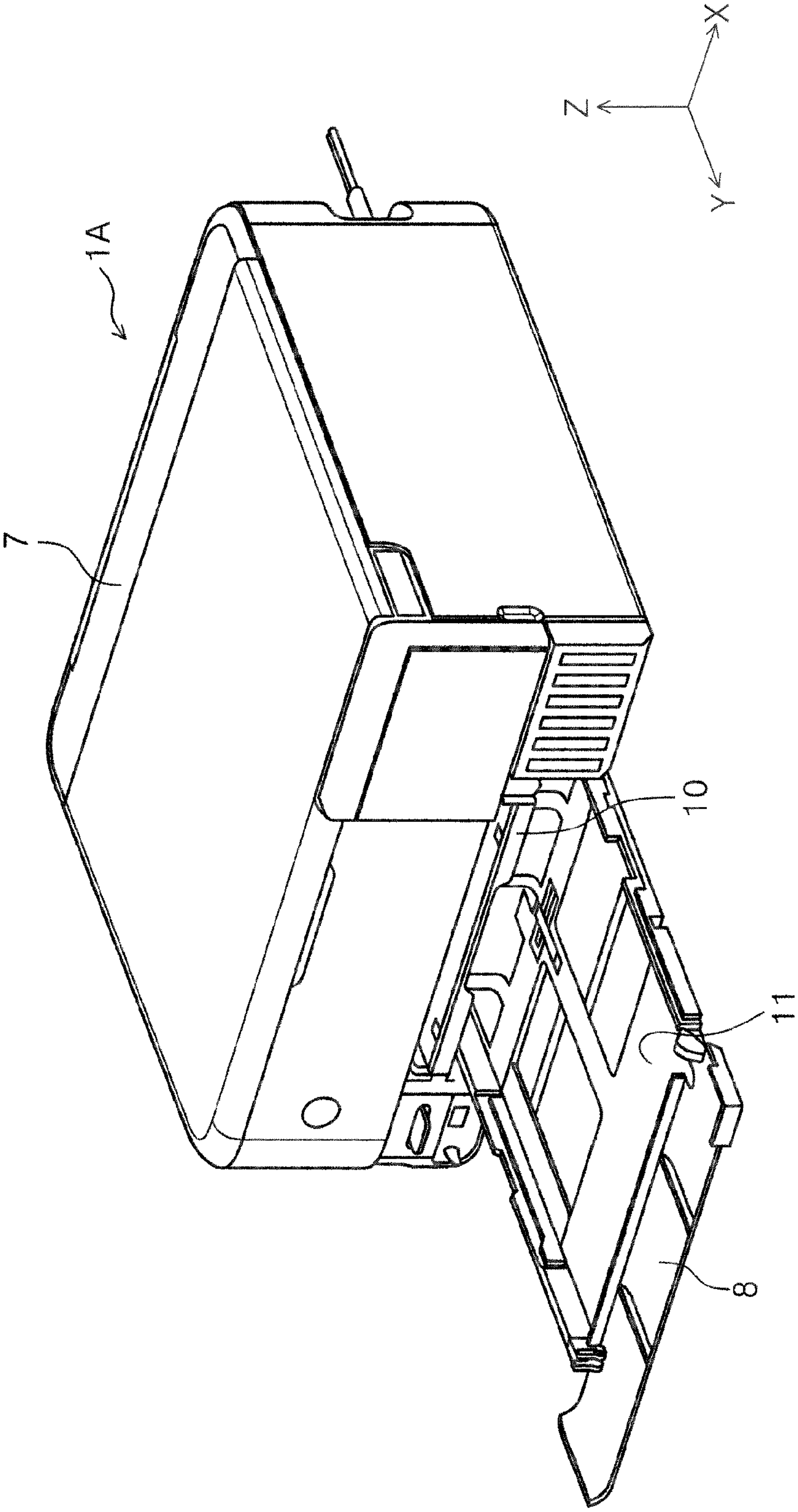
FIG. 3 is a perspective view of the recording apparatus according to the first exemplary embodiment of the present disclosure, and is a diagram illustrating a state in which a cassette has been drawn out to the front side.

The recording apparatus 1A is configured to perform printing on a medium set in a feed tray 9 by opening a rear cover 7 and a front cover 8 from the state illustrated in FIG. 1 and by drawing out the feed tray 9 and a discharge tray 10 to the state illustrated in FIG. 2. Furthermore, as illustrated in FIG. 3, the front cover 8 is coupled to a cassette 11 in which the medium is mounted. By drawing out the cassette 11 together with the front cover 8, the medium can be set in the cassette 11. In other words, the recording apparatus 1A is configured to perform recording on the medium set in the feed tray 9, and is also configured to perform recording on a medium set in the cassette 11.

Referring to FIG. 5, when performing recording on a medium set in the feed tray 9, the recording apparatus 1A rotates a feed roller 12 once in a rotation direction C1 to feed out the medium to a pair of transport rollers 3 (see FIG. 19). Subsequently, by rotating the transport driving roller 3*a* constituting the pair of transport rollers 3 in a rotation direction C2, the medium is transported to the opposing position P1 opposing the recording head 2. Subsequently, the transport driving roller 3*a* and a discharge driving roller 15*a* that constitutes the pair of discharge rollers 15 (see FIG. 19) are rotated in the rotation direction C2 to discharge the medium, to which recording has been performed, onto the discharge tray 10. Note that reference numeral 3*b* in FIG. 19 is a transport driven roller that constitutes the pair of transport rollers 3. The medium is nipped between the transport driving roller 3*a* and the transport driven roller 3*b*. The transport driving roller 3*a* is an example of a transport roller. Furthermore, reference numeral 15*b* is a discharge driven roller that constitutes the pair of discharge rollers 15. The medium is nipped between the discharge driving roller 15*a* and the discharge driven roller 15*b*. Furthermore, a roller denoted by reference numeral 14 is a roller that restricts the medium from lifting.

Referring back to FIG. 5, a transport path serving as a feeding path of the medium with the feed roller 12 constitutes a transport path R1, and the transport path of the medium with the pair of transport rollers 3 constitutes a transport path R4. Hereinafter, the transport path R1 is a path from the feed roller 12 to the pair of transport rollers 3, and the transport path R4 is a path downstream of the pair of transport rollers 3 or is a path in the +Y direction from the pair of transport rollers 3.

Note that a separating roller 13 is provided at a position in the transport path R1 that opposes the feed roller 12. A rotational resistance is applied to the separating roller 13 with a torque limiter (not shown), which nips the medium with the feed roller 12 to prevent multi feeding of the medium when a plurality of mediums is set in the feed tray 9. The separating roller 13 is an example of a nip portion that nips the medium together with the feed roller 12.

As illustrated in FIG. 5, the feed roller 12 of the present exemplary embodiment is D-shaped when viewed in the X-axis direction, in other words, the feed roller 12 has a shape in which a portion of an arc surface of a cylinder is formed in a flat shape; however, the feed roller 12 is not limited to such a configuration. For example, the feed roller 12 may be O-shaped when viewed in the X-axis direction, in other words, the feed roller 12 may have a columnar shape. Since a portion of the D-shaped feed roller 12 has a flat shape, there is an advantage in that the feed roller 12 can be separated with a simple structure, and there is an advantage in the O-shaped feed roller 12 in that the feed roller 12 can be reduced in size.

A support member 46 is provided at a position opposing the feed roller 12. The support member 46 is positioned below the feed tray 9 in an extended state and supports the set medium together with the feed tray 9. In other words, lower portions of the set mediums are supported by the support member 46 and upper portions of the set mediums are supported by the feed tray 9.

The support member 46 is provided in a slidable manner about a rocker-shaft 46*a* (see FIG. 19) positioned on the upper portion thereof. By sliding, the support member 46 switches between a state in which the supported mediums are in contact with the feed roller 12 and a state in which the supported mediums are separated from the feed roller 12. The sliding operation of the support member 46 is achieved by a sliding mechanism (not shown).

In a feed standby state, the feed roller 12 is, as illustrated in FIG. 5, in a state in which the flat portion in the outer circumference thereof opposes the support member 46, and is in a state in which the support member 46 is separated the most from the feed roller 12. When a feeding operation is started from the above state, the feed roller 12 starts to rotate in the rotation direction C1 so that the arc area in the outer circumference thereof opposes the support member 46. The support member 46 slides so as to synchronize with the timing at which the arc area opposes the support member 46 and presses the supported medium against the feed roller 12.

With the above, the uppermost medium among the set mediums is fed downstream with the feed roller 12.

The amount of rotation of the feed roller 12 can be detected by a rotation detection member (not shown). When feeding the medium, the feed roller 12 stops after rotating 360° and returns to the state in FIG. 5. Furthermore, the support member 46 is also returned to the state illustrated in FIG. 15 or is returned to the state in which the support member 46 is separated the most from the feed roller 12.

Note that a pair of rollers 18 constituted by an auxiliary roller 16 rotatable in the rotation direction C1 and a driven roller 17 provided at a position opposing the auxiliary roller 16 are provided in the transport path R1 between the feed roller 12 and the pair of transport rollers 3. When the medium is transported through the transport path R1, in other words, when the medium is at a pinching position of the pair of rollers 18, the recording apparatus 1A assists the transportation of the medium by rotating the auxiliary roller 16 in the rotation direction C1. Accordingly, the recording apparatus 1A can suppress failure in the transportation of the medium in the transport path R1 from occurring.

Note that the meaning of "assisting the transportation of the medium" is not limited to assisting the transportation of the medium when the medium is transported towards the opposing position P1 with the pair of transport rollers 3 and includes assisting the transportation of the medium with a member other than the pair of transport rollers 3 such as, for example, assisting the feeding out of the medium with the feed roller 12. In other words, in the present specification, the meaning of "transport" includes all the operations that move the medium such as feeding out of the medium with the feed roller 12, the transportation of the medium with the pair of transport rollers 3, and discharging of the medium with the pair of discharge rollers 15. Furthermore, the pair of rollers 18 are provided between a junction point J1 of the transport path R1 and a transport path R3, and the feed roller 12. The pair of rollers 18 being provided at the above position allows a medium short in the transport direction to be transported.

When printing is performed on the medium set in the cassette 11, the recording apparatus 1A feeds the medium to the pair of transport rollers 3 by pivoting a pick-unit pivot shaft 20, rotating a pickup roller 21 of a pick unit 19 in the rotation direction C2, and transporting the medium through a transport path R2 serving as a feeding path. Subsequently, by rotating the transport driving roller 3*a* constituting the pair of transport rollers 3 in the rotation direction C2, the medium is transported to the opposing position P1 opposing the recording head 2. Subsequently, the transport driving roller 3*a* and the discharge driving roller 15*a* that constitutes the pair of discharge rollers 15 are rotated in the rotation direction C2 to discharge the medium to which recording has been performed onto the discharge tray 10.

After performing recording on a surface of the medium on one side, the recording apparatus 1A inverts the medium by transporting the medium to the transport path R3 serving as an inversion path before the medium is discharged to the discharge tray 10, which allows recording on a surface of the medium on the other side to be performed. Note that as illustrated in FIG. 5, a portion of the transport path R3 overlaps the transport path R2, and an inverting roller 22, and a plurality of driven rollers 23, 24, 25, and 26 at positions opposing the inverting roller 22 are provided in the overlapped transport path. Furthermore, a position of a rotation shaft of the inverting roller 22 in the Z-axis direction overlaps a center line L1 of the transport path R3 in the Z-axis direction.

Figure 4:
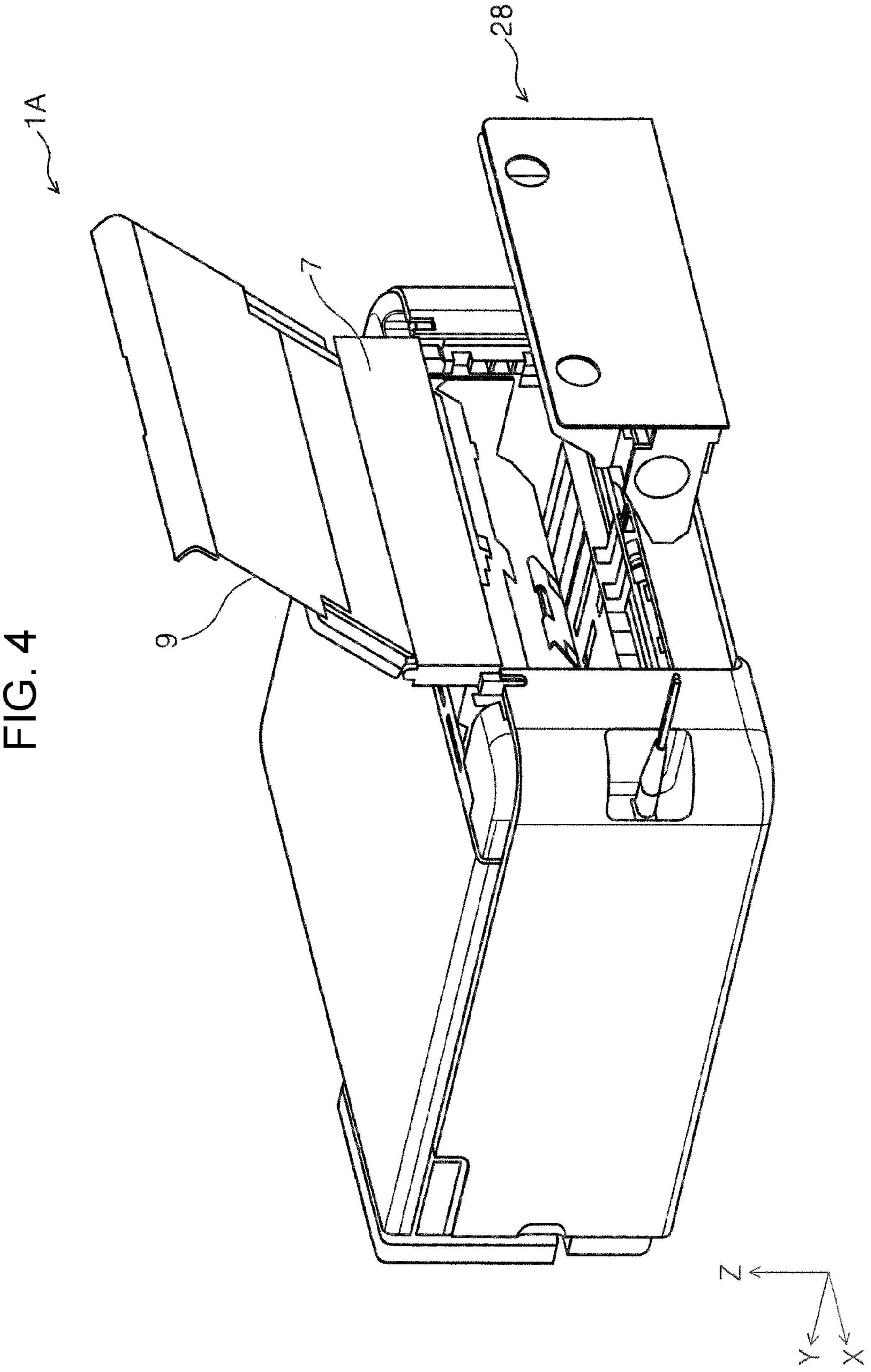
FIG. 4 is a perspective view of the recording apparatus according to the first exemplary embodiment of the present disclosure, and is a diagram illustrating a state in which an inverting unit has been drawn out to the rear side.
Figure 5:
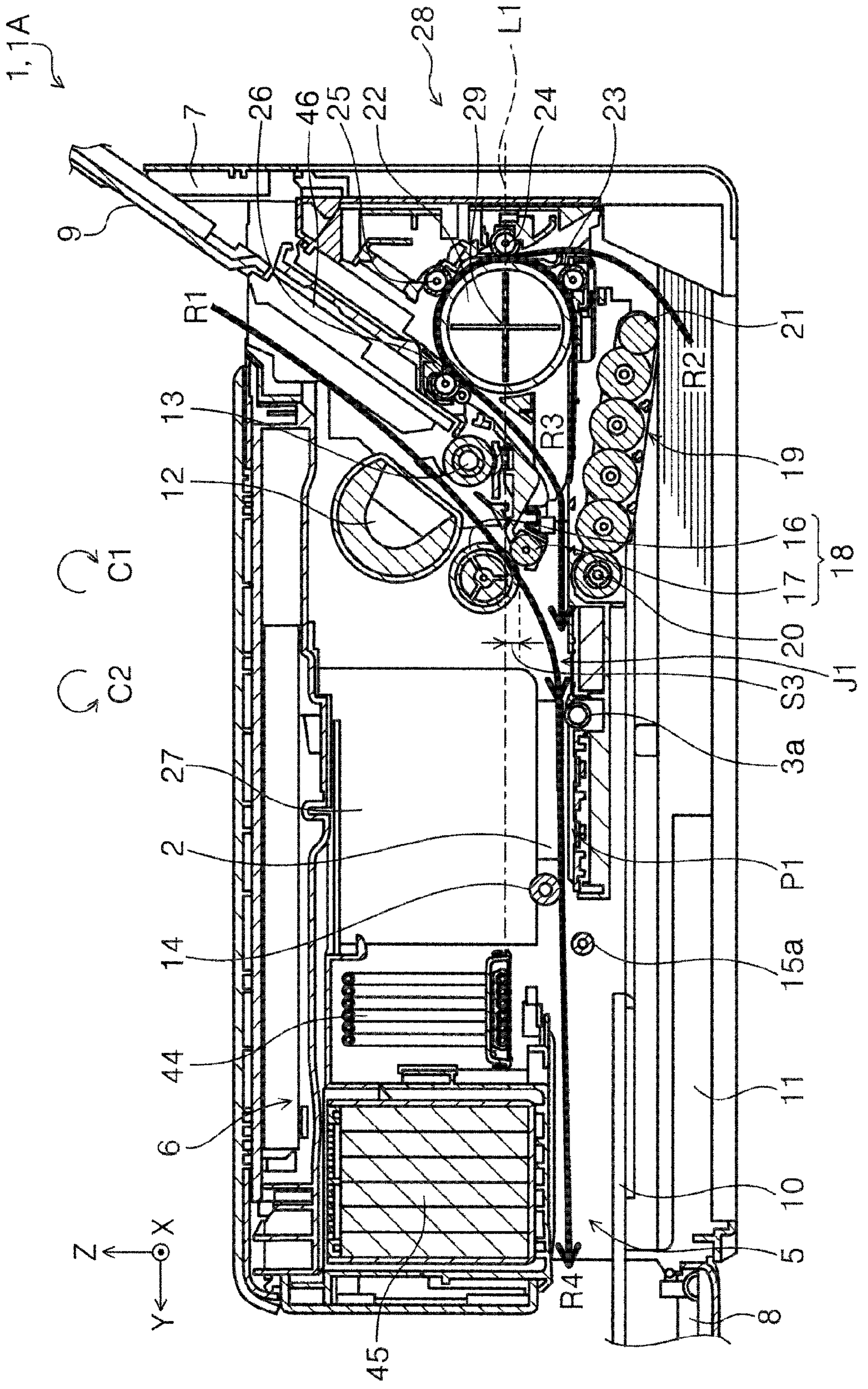
FIG. 5 is a side sectional view of the recording apparatus according to the first exemplary embodiment of the present disclosure.

Note that as illustrated in FIG. 4, an inverting unit 28 that includes the inverting roller 22 and the like and that constitutes the transport path R3 is detachable from the recording apparatus 1A. In place of the inverting unit 28, a unit including a transport path different from that of the inverting unit 28 can be attached to the recording apparatus 1A.

The recording head 2 of the present exemplary embodiment is provided in a carriage 27 that is movable in the X-axis direction. The recording apparatus 1A is configured to form an image by discharging ink to the transported medium from the recording head 2 while reciprocating the carriage 27 in the X-axis direction. By including the carriage 27 configured in the above manner, the recording apparatus 1A forms a desired image on the medium by repetition of transporting the medium at a predetermined transport amount and discharging the ink while moving the carriage 27 in the X-axis direction while the medium is at a halt.

Note that the recording apparatus 1A is a so-called serial printer that performs recording by alternately repeating transportation of the medium for a predetermined amount and reciprocation of the carriage 27. However, the recording apparatus 1A may be a so-called line printer that continuously performs recording using a line head in which nozzles are formed in the X-axis direction in a linear manner and by continuously transporting the medium.

As described above, the recording apparatus 1A includes the recording head 2 that performs recording, the feed roller 12 that feeds out the medium set in the feed tray 9, the transport driving roller 3*a* that transports the medium fed out by the feed roller 12 towards the opposing position P1 where the medium opposes the recording head 2, and the auxiliary roller 16 that assists the transportation of the medium. Furthermore, as illustrated in FIG. 5, the transport path R3 serving as the inversion path in which the medium is inverted is provided, with respect to the transport driving roller 3*a*, in the −Y direction and on a side opposite to the recording head 2. Furthermore, as illustrated in FIG. 5, the auxiliary roller 16 of the recording apparatus 1A is provided at the position between the feed roller 12 and the transport driving roller 3*a* and at the position between the transport path R3 and the transport driving roller 3*a*. Note that a transport speed of the medium with the feed roller 12 alone, a transport speed of the medium with the auxiliary roller 16 alone, and a transport speed of the medium with the transport driving roller 3*a* alone may be set to become slower in the order of the feed roller 12, the auxiliary roller 16, and the transport driving roller 3*a*. In such a case, the medium is transported inside the recording apparatus 1A so that unnecessary tension is not applied to the medium.

Alternatively, it is also desirable to set the transport speed of the medium with the transport driving roller 3*a* alone to be faster than the transport speed of the medium with the auxiliary roller 16 alone. With such a setting, the flexure of the medium between the auxiliary roller 16 and the transport driving roller 3*a* can be suppressed from becoming excessive.

Auxiliary Roller

An arrangement and the like of the auxiliary roller 16 of the recording apparatus 1A will be described with reference to FIGS. 5 to 9. Note that as in the present exemplary embodiment, by providing the auxiliary roller 16 between the feed roller 12 and the transport driving roller 3*a* or between the transport path R3, which is the inversion path, and the transport driving roller 3*a*, a transport accuracy of the medium at a position where transport failure of the medium tends to occur can be made high effectively.

Figure 6:
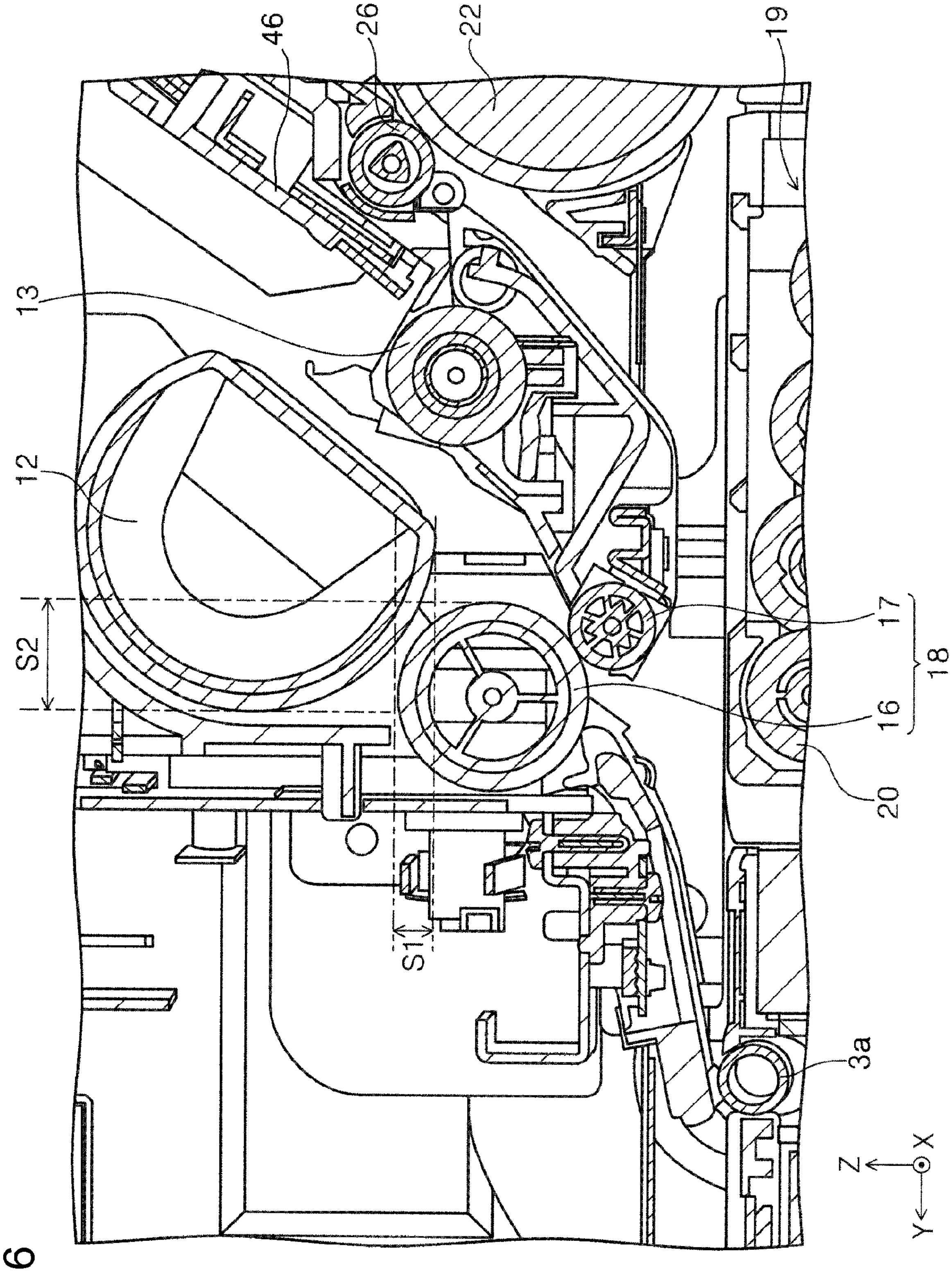
FIG. 6 is a side sectional view of a portion around an auxiliary roller of the recording apparatus according to the first exemplary embodiment of the present disclosure.

As illustrated in FIG. 6, when in side view, the auxiliary roller 16 overlaps the feed roller 12 in the Z-axis direction by area S1. Put in another way, when in side view, the auxiliary roller 16 overlaps the feed roller 12 in the direction in which the medium and the recording head 2 oppose each other at the opposing position P1. As described above, since the recording apparatus 1A includes the auxiliary roller 16, which assists the transportation of the medium, between the feed roller 12 and the transport driving roller 3*a*, the transport failure of the medium can be suppressed and, in addition to that, an increase in the size of the apparatus is suppressed by disposing, in side view, the auxiliary roller 16 to overlap the feed roller 12 in the opposing direction extending in the Z-axis direction.

Note that in the present specification, "in side view" means to view, in the X-axis direction, the configuration of the apparatus on a YZ plane.

Furthermore, as illustrated in FIG. 5, in side view, the center line L1 of the transport path R3 overlaps the auxiliary roller 16 in the Z-axis direction. Put in another way, in side view, the auxiliary roller 16 overlaps, in the opposing direction extending in the Z-axis direction by area S3, a center position of the transport path R3 in the opposing direction. Accordingly, the recording apparatus 1A suppresses increase in the size of the apparatus by disposing the auxiliary roller 16 to, in the opposing direction, overlap the center position of the transport path R3 in the opposing direction when in side view.

Particularly in the configuration of the present exemplary embodiment, when in side view, the auxiliary roller 16 is disposed to overlap the feed roller 12 in the opposing direction, and when in side view, the auxiliary roller 16 is disposed to overlap, in the opposing direction, the center position of the transport path R3 in the opposing direction; accordingly, an increase in the size of the apparatus is suppressed effectively.

Note that as illustrated in FIGS. 5 and 6, the transport path R3 is provided with the inverting roller 22. As illustrated in FIG. 5, the inverting roller 22 is provided inside the transport path R3. Furthermore, as illustrated in FIG. 5, the inverting roller 22 is configured to, by rotation thereof, move the medium in the transport path R3 from an end portion in FIG. 5 located on one side in the Z-axis direction corresponding to the lower side to an end portion in FIG. 5 located on the other side corresponding to the upper side. As illustrated in FIG. 5, a rotation shaft 29 of the inverting roller 22 is at the center position of the inversion path. With such a configuration, the recording apparatus 1A easily forms the transport path R3 using the inverting roller 22 in which the rotation shaft 29 is disposed at the center position of the transport path R3. Furthermore, with such a configuration, determination of whether the auxiliary roller 16, when in side view, overlaps the center position of the transport path R3 in the Z-axis direction is facilitated.

Furthermore, as illustrated in FIG. 6, when in side view, the auxiliary roller 16 overlaps the feed roller 12 in the Y-axis direction by area S2. Put in another way, when in side view, the auxiliary roller 16 overlaps the feed roller 12 in the discharge direction of the medium, which is a direction extending in the Y-axis direction. In the recording apparatus 1A, when in side view, since the auxiliary roller 16 overlaps the feed roller 12 not only in the Z-axis direction but also in the Y-axis direction, an increase in the size of the apparatus is suppressed in a particularly effective manner.

Furthermore, as illustrated in FIG. 7, when in side view, the position of the rotation center of the auxiliary roller 16 is disposed on the side in the medium discharge direction, which is a direction extending in the Y-axis direction, with respect to the position of the rotation center of the pick-unit pivot shaft 20 by a distance L2. Since the recording apparatus 1A is configured in such a manner, the cassette 11 can be pushed in deep towards the side in the direction opposite the discharge direction of the medium; accordingly, an increase in the size of the apparatus is suppressed.

As illustrated in FIG. 8, the recording apparatus 1A transmits driving force of a transport motor 30 to the transport driving roller 3*a* through a driving wheel train 31 to rotate the transport driving roller 3*a*, and transmits the rotation of the transport driving roller 3*a* to the feed roller 12 and a drive shaft 33 through a drive transmission switching mechanism 32 to rotate the feed roller 12 and the drive shaft 33. Furthermore, the rotation of the drive shaft 33 is transmitted to the auxiliary roller 16 and the auxiliary roller 16 is rotated. Note that the driven roller 17 forming the pair of rollers 18 together with the auxiliary roller 16 is drivenly rotated with the rotation of the auxiliary roller 16. As described above, in the recording apparatus 1A, the roller, among the pair of rollers 18, on the upper side is configured as the driving roller that is driven by the driving force of the transport motor 30. By having such a configuration, bulky structures such as the drive transmission switching mechanism 32 can be configured at a position away from the transport path R3; accordingly, an increase in the size of the apparatus is suppressed.

Note that a power transmission path from the transport motor 30 to each roller will be further described later.

Furthermore, as illustrated in FIGS. 8 and 9, in the recording apparatus 1A, the auxiliary roller 16 completely overlaps the feed roller 12 in an axial direction of the rotation shaft of the transport driving roller 3*a*, which is a direction extending in the X-axis direction. In the recording apparatus 1A, since the auxiliary roller 16 overlaps the feed roller 12 not only in the Z-axis direction but also in the X-axis direction, an increase in the size of the apparatus is suppressed in a particularly effective manner. Furthermore, as illustrated in FIG. 5, the recording apparatus 1A includes tubes 44 and waste liquid boxes 45. Furthermore, the auxiliary roller 16 overlaps the tubes 44 in the height direction when in side view, and the auxiliary roller 16 overlaps the waste liquid boxes 45 in the height direction.

As illustrated in FIG. 9, the auxiliary roller 16 is inserted around a rotation shaft 34 extending in the X-axis direction. Furthermore, the auxiliary roller 16 is configured to move along the rotation shaft 34 between a wall portion 35 and a wall portion 36 in a moving direction M1 and a moving direction M2. Note that the auxiliary roller 16 is configured so that the auxiliary roller 16 engages with the drive shaft 33 at any position between the wall portion 35 and the wall portion 36. The recording apparatus 1A is capable of transporting the medium in the transport path R1 in a direction opposite the normal transport direction to perform skew removal that prevents the medium to be transported in a skewed manner. Since the auxiliary roller 16 is configured to move in the X-axis direction, the disposition of the auxiliary roller 16 in the X-axis direction can be adjusted during skew removal; accordingly, skew removal can be performed effectively.

Second Exemplary Embodiment

Referring next to FIGS. 10 to 14, a recording apparatus 1B of a second exemplary embodiment will be described. Note that in FIGS. 10 to 14, the constituent members common to those of the first exemplary embodiment described above will be denoted with the same reference numerals and detailed description thereof will be omitted. Note that the recording apparatus 1B of the present exemplary embodiment has characteristics that are similar to those of the recording apparatus 1A of the first exemplary embodiment described above, and other than the portions described below, the recording apparatus 1B has a shape similar to that of the recording apparatus 1A of the first exemplary embodiment.

FIG. 10 indicates which portion of and in which direction the recording unit 5 of the recording apparatus 1B has been viewed in each of the FIGS. 11 to 14. FIGS. 11 and 13 illustrate the same state viewed from different angles and illustrate a state in which the medium is not pinched by the feed roller 12 and the separating roller 13, and the pair of rollers 18. Furthermore, FIGS. 12 and 14 illustrate the same state viewed from different angles and illustrate a state in which the medium is pinched by the feed roller 12 and the separating roller 13, and the pair of rollers 18. Note that FIGS. 11 and 12 are diagrams including cut paper Pa, serving as an example of the medium, so that understanding of the positional relationships between the medium, the feed roller 12, the separating roller 13, and the pair of rollers 18 is facilitated.

As illustrated in FIGS. 13 and 14, an eccentric cam 38 is provided on a roller shaft 37 of the feed roller 12. An auto sheet feeder frame 40 in which the separating roller 13 and the driven roller 17 are provided is provided below the eccentric cam 38. The auto sheet feeder frame 40 is pivotable relative to a pivot shaft 41. A cam receiver 39 is formed in the auto sheet feeder frame 40. Furthermore, the eccentric cam 38 is configured to come in contact with the cam receiver 39. In other words, in the recording apparatus 1B, the auxiliary roller 16 and the driven roller 17 can come in contact with each other and become separated from each other by pivoting the auto sheet feeder frame 40 relative to the pivot shaft 41.

Since the recording apparatus 1B is configured in such a manner, the auxiliary roller 16 and the driven roller 17 can be made to come in contact with each other and become separated from each other, and the feed roller 12 and the separating roller 13 can be made to come in contact with each other and become separated from each other without the need for an additional motor. Note that by separating the auxiliary roller 16, the transport load of the transport driving roller 3*a* while the medium is transported is reduced and the influence on the recording while recording becomes small. In the recording apparatus 1B, when feeding out the medium set in the feed tray 9, the feed roller 12 and the separating roller 13, and the auxiliary roller 16 and the driven roller 17 serving as the pair of rollers 18 pinch the medium. Other than when feeding out the medium set in the feed tray 9, the feed roller 12 and the separating roller 13, and the auxiliary roller 16 and the driven roller 17 serving as the pair of rollers 18 are separated from each other.

Furthermore, since the recording apparatus 1B is configured in such a manner, by adjusting the shape of the eccentric cam 38, the pinching timing of the medium with the feed roller 12 and the separating roller 13, and the pinching timing of the medium with the auxiliary roller 16 and the driven roller 17 can be shifted from each other. Note that since the auxiliary roller 16 can be made to come in contact and become separated at timings different from those of the feed roller 12, when auxiliary transport force is needed, the force can be provided accordingly. When a medium shorter than a distance between the feed roller 12 and the transport driving roller 3*a* is transported, the auxiliary roller 16 comes in contact with the medium so that the short medium can be transported, and separates from the medium when a long medium is transported so that the flexing space of the medium when performing skew removal is increased. Note that in the present exemplary embodiment, the feed roller 12 and the auxiliary roller 16 on the upper side of the recording apparatus 1B are driving rollers that are driven by the driving force of the transport motor 30; however, the rollers that are at the positions of the separating roller 13 and the driven roller 17 on the lower side of the recording apparatus 1B may be driving rollers that are driven by the driving force of the transport motor 30.

Third Exemplary Embodiment

Referring next to FIGS. 15 to 18, a recording apparatus 1C of a third exemplary embodiment will be described. Note that in FIGS. 15 to 18, the constituent members common to those of the first exemplary embodiment and the second exemplary embodiment described above will be denoted with the same reference numerals and detailed description thereof will be omitted. Note that the recording apparatus 1C of the present exemplary embodiment has characteristics that are similar to those of the recording apparatus 1A of the first exemplary embodiment described above, and other than the portions described below, the recording apparatus 1C has a shape similar to that of the recording apparatus 1A of the first exemplary embodiment.

FIG. 15 indicates which portion of and in which direction the recording unit 5 of the recording apparatus 1C has been viewed in each of the FIGS. 16 to 18. FIGS. 16 and 17 are diagrams viewed from the same angle and illustrate different states of the auxiliary roller 16 while skew removal is performed. While FIGS. 16 and 17 each illustrates a state in which the pair of rollers 18 are at positions pinching the medium, the illustration of the medium is omitted. Furthermore, FIG. 18 is an enlarged view of area XVIII in FIG. 15 and is viewed from the same angle as that of FIG. 15.

As illustrated in FIGS. 16 and 18, the recording apparatus 1C includes a plurality of auxiliary rollers, namely, auxiliary rollers 16A and 16B as the auxiliary roller 16. Furthermore, the recording apparatus 1C also includes a plurality of driven rollers 17, namely, a driven roller 17A corresponding to the auxiliary roller 16A, and a driven roller 17B corresponding to the auxiliary roller 16B. Note that the rotation shaft 34 is common to the auxiliary rollers 16A and 16B. Note that the auxiliary rollers 16A and 16B are rotated by rotary driving force of the transport motor 30 with an auxiliary transmission shaft 42 that transmits the rotation of the drive shaft 33, and a shaft gear 43 that is attached to the rotation shaft 34 and that transmits the rotation of the auxiliary transmission shaft 42 to the rotation shaft 34 interposed in between.

Note that as it can be understood by comparing FIGS. 16 and 17 with each other, the auxiliary rollers 16A and 16B are configured to change positions by pivoting relative to the shaft gear 43 in a pivoting direction. Furthermore, similar to the auxiliary roller 16 of the recording apparatus 1A of the first exemplary embodiment, the auxiliary rollers 16A and 16B are configured to move between the wall portion 35 and the wall portion 36 in the X-axis direction. By being configured in such a manner, skew removal can be performed more effectively than that of the auxiliary roller 16 of the recording apparatus 1A of the first exemplary embodiment. The above can be achieved because the auxiliary rollers 16A and 16B are configured to change positions by pivoting relative to the shaft gear 43 in the pivoting direction. By changing the positions of the auxiliary rollers 16A and 16B, the medium can be transported without being applied excessive force thereto even when the medium is in the skewed state and is slacked in the transport path R1.

Note that the auxiliary rollers 16A and 16B of the present exemplary embodiment are configured to slide in the X-axis direction; however, the auxiliary rollers 16A and 16B may be configured not to slide in the X-axis direction. The above is because a reduction in size can be achieved and the number of parts can be reduced by configuring the auxiliary rollers 16A and 16B to not slide in the X-axis direction.

Regarding Skew Correction

Referring next to FIGS. 19 to 21, skew correction during feeding of the medium in the exemplary embodiments described above will be described.

Referring first to FIG. 19, a path length of the transport path R1 will be described. In FIG. 19, a position J1 is a nip position in the transport path R1 where the medium is nipped by the feed roller 12 and the separating roller 13. Position J2 is a nip position in the transport path R1 where the medium is nipped between the auxiliary roller 16 and the driven roller 17. Position J3 is a position where a medium detection sensor 56 detects the medium. Note that the medium detection sensor 56 is a medium detection member that is provided in the transport path R1 between the auxiliary roller 16 and the pair of transport rollers 3 and that detects passage of the medium.

Position J4 is a nip position where the medium is nipped between the pair of transport rollers 3. Position J5 is the most upstream position in a recordable range of the recording head 2. The recording head 2 includes ink discharge nozzles (not shown) in the X direction and in the Y direction. The position J5 is a position where recording is performed with the ink discharge nozzle positioned farthest in the −Y direction in the Y direction.

Note that when the medium supported by the support member 46 is fed out with the feed roller 12, a maximum value Lmax of a feeding length of the medium with the feed roller 12 is defined by a circumferential direction length of an arc area 12*a* in an outer circumference of the feed roller 12, and the timing at which the uppermost medium, among the mediums set in the support member 46, comes in contact with the arc area 12*a* in the outer circumference of the feed roller 12, in other words, the position where the medium set in the support member 46 comes in contact with the arc area 12*a* in the outer circumference of the feed roller 12. When the medium to be fed out comes in contact with a start position S of the arc area 12*a* in the outer circumference of the feed roller 12, the maximum value Lmax is equivalent to the circumferential direction length of the arc area 12*a*. The timing at which the uppermost medium, among the mediums set in the support member 46, comes in contact with the arc area 12*a* in the outer circumference of the feed roller 12 is defined by a drive mechanism (not shown) that drives the support member 46.

Furthermore, the timing at which the uppermost medium, among the mediums set in the support member 46, comes in contact with the arc area 12*a* in the outer circumference of the feed roller 12 becomes earliest is when the mediums with the maximum mount height is mounted in the support member 46. Accordingly, in such a case, the feeding length of the medium with the feed roller 12 is the maximum value Lmax.

Furthermore, the maximum value Lmax of the feeding length of the medium with the feed roller 12 is set under a path length L3 that is the sum of a path length L1 from the nip position J1 of the medium between the feed roller 12 and the separating roller 13 to a nip position J4 of the medium between the pair of transport rollers 3, and a path length L2 from the nip position J4 of the medium between the pair of transport rollers 3 to the most upstream position J5 in the recordable range of the recording head 2. In other words, at the timing at which the medium feeding operation in which the feed roller 12 rotates once is completed, the front end of the medium does not reach the position J5.

Jamming of the medium at the opposing position where the medium opposes the recording head 2 can be suppressed with the above when the medium is fed with the feed roller 12. Additionally, by reducing the size of the feed roller 12, the size of the entire apparatus can be reduced.

Furthermore, when the medium is positioned to the recording start position, there is no need to back feed the medium in the −Y direction. Accordingly, causing of damage and wrinkles in the medium due to back feeding the medium in the −Y direction and jamming are not brought about.

Note that in the present exemplary embodiment, the maximum value Lmax of the feeding length of the medium with the feed roller 12 is set under a path length L4 from the nip position J1 of the medium between the feed roller 12 and the separating roller 13 to a position where the medium detection sensor 56 detects the medium. The above will be described further later.

Note that in the present exemplary embodiment, in order to correspond to medium-sized mediums such as a name card, a card, and the like, the path length from the nip position J1 to the nip position J2, the path length from the nip position J2 to the nip position J4, and the path length from the nip position J4 to the nip position of the medium between the pair of discharge rollers 15 are set shorter than the length of the minimum-sized medium described above in the longitudinal direction. By allowing the medium-sized medium to be transported through the transport paths R1 and R4 in the above manner, when configured, the transport path R2 (see FIG. 5) does not have to consider the minimum-sized medium.

Furthermore, desirably, at least the path length from the nip position J1 to the nip position J2, and the path length from the nip position J2 to the nip position J4 are set shorter than the length of the medium-sized medium described above in the short direction. With the above, even if the user makes a mistake in the direction in which the minimum-sized medium described above is set, the medium can reach the pair of transport rollers 3. The user will be able to move the stagnating medium at a position that is relatively easy for the user to visually confirm, in other words, between the pair of transport rollers 3 and the pair of discharge rollers 15.

Furthermore, a common tangential line of the feed roller 12 and the separating roller 13 at the nip position J1 is, desirably, common to a common tangential line of the auxiliary roller 16 and the driven roller 17 at the nip position J2. With the above, the front end of the medium fed out from the nip position J1 is nipped between the auxiliary roller 16 and the driven roller 17 in smooth manner.

Referring subsequently to FIG. 20, a configuration of the power transmission path from the transport motor 30 to each roller will be described.

The transport motor 30 is a common drive source for the transport driving roller 3*a*, the discharge driving roller 15*a*, the feed roller 12, the auxiliary roller 16, and the pickup roller 21. The transport motor 30 is controlled by a control unit 50 serving as a control member.

Motive power of the transport motor 30 is directly transmitted to the transport driving roller 3*a* and the discharge driving roller 15*a*, in other words, when the transport motor 30 rotates in the normal direction, the transport driving roller 3*a* and the discharge driving roller 15*a* rotate in the normal direction or rotate in the rotation direction C2 in FIG. 19, and when the transport motor 30 rotates in the reverse direction, the transport driving roller 3*a* and the discharge driving roller 15*a* rotate in the reverse direction or rotate in the rotation direction C1 in FIG. 19.

Driving force from the transport motor 30 to the auxiliary roller 16 is transmitted through a one-way clutch 54 serving as an example of a rotation restricting member. Regardless of the rotation direction of the transport motor 30, the auxiliary roller 16 is rotated in the normal direction, or in the rotation direction C1 in FIG. 19, at all times with the one-way clutch 54.

The driving force from the transport motor 30 to the feed roller 12 and the pickup roller 21 is transmitted through a drive transmission switching mechanism 52 and a planetary gear mechanism 53. The drive transmission switching mechanism 52 is switched between a "drive-on" state in which the driving force is transmitted to the planetary gear mechanism 53, and a "drive-off" state in which the driving force is not transmitted. Furthermore, the switching of the above is performed by the carriage 27. In other words, the drive transmission switching mechanism 52 is configured to engage with the carriage 27 at a position deviated from a print area in a movable range of the carriage 27. Furthermore, the "drive-on" and the "drive-off" states are switched by the carriage 27 deviating from the print area engaging with the drive transmission switching mechanism 52.

When the drive transmission switching mechanism 52 is in the "drive-on" state, the driving force of the transport motor 30 is transmitted to the planetary gear mechanism 53. When the transport motor 30 rotates in the normal direction, the planetary gear mechanism 53 transmits the driving force to the pickup roller 21, and when the transport motor 30 rotates in the reverse direction, the planetary gear mechanism 53 transmits the driving force to the feed roller 12. In other words, the planetary gear mechanism 53 can be denoted as a planetary gear mechanism that transmits the driving force of the transport motor 30 rotating in the reverse direction to the feed roller 12, and that does not transmit the driving force of the transport motor 30 rotating in the normal direction to the feed roller 12.

With the configuration described above, when the medium is fed with the feed roller 12, the transport motor 30 is rotated in the reverse direction. With the above, the feed roller 12 and the auxiliary roller 16 both rotate in the normal direction or in the rotation direction C1 in FIG. 19.

Referring subsequently to FIG. 21, control of the transport motor 30 during feeding of the medium will be described. Furthermore, skew correction of the medium in the above will be described. Note that the rotation direction of each roller associated with the rotation of the transport motor 30 is added to the right side of the flow chart in FIG. 21.

When feeding the medium using the transport path R1, the control unit 50 first sets the drive transmission switching mechanism 52 to the "drive-on" state (step S101) and, subsequently, rotates the transport motor 30 in the reverse direction (step S102). With the above, the feed roller 12 and the auxiliary roller 16 rotate in the normal direction or in the rotation direction C1 in FIG. 19. Furthermore, during the above, the set mediums are pushed up with the support member 46 and come in contact with the feed roller 12. Among the set mediums, the uppermost medium is fed downstream. Note that during the above, the transport driving roller 3*a* rotates in the reverse direction or in the rotation direction C1 in FIG. 19.

After the feed roller 12 has rotated once (Yes in step S103), the control unit 50 stops the transport motor 30 (step S104). Subsequently, the drive transmission switching mechanism 52 is set to the "drive-off" state (step S105), and the transport motor 30 is rotated in the normal direction (step S106). With the above, while the feed roller 12 is in the stopped state, the auxiliary roller 16 rotates in the normal direction or in the rotation direction C1 in FIG. 19 and, furthermore, the transport driving roller 3*a* also rotates in the normal direction or in the rotation direction C2 in FIG. 19.

In the present exemplary embodiment, at the start of the rotation of the transport motor 30 in step S106, in other words, at the point when the feeding operation of the medium by rotating the feed roller 12 once has ended, the front end of the medium has not reached the medium detection sensor 56.

In other words, the maximum value Lmax of the feeding length of the medium with the feed roller 12 is set under the path length L4 from the nip position J1 of the medium between the feed roller 12 and the separating roller 13 to the position where the medium is detected by the medium detection sensor 56.

Subsequently, with the transportation of the medium with the auxiliary roller 16, when the front end of the medium is detected by the medium detection sensor 56 (Yes in step S107), the control unit 50 rotates the transport motor 30 for a predetermined number of steps in the normal direction (step S108). Note that the predetermined number of steps corresponds to the amount of rotation of the transport motor 30 for the front end of the medium to be nipped between the pair of transport rollers 3 and, furthermore, for the medium to advance downstream to a certain degree from the pair of transport rollers 3.

Subsequently, the control unit 50 rotates the transport motor 30 for the predetermined number of steps in the reverse direction (step S109). With the above, the front end of the medium is discharged to a portion upstream of the pair of transport rollers 3, flexure is formed in the medium between the auxiliary roller 16 and the pair of transport rollers 3, and skewing is corrected by having the front end of the medium confirming to the nip position between the pair of transport rollers 3.

As described above, the control unit 50 is configured to perform a feeding mode including the step (step S102) of feeding the set medium with the feed roller 12 by rotating the transport motor 30 in the reverse direction, the step (step S108) of nipping the front end of the medium between the pair of transport rollers 3 by rotating the transport motor 30 in the normal direction, and the step (step S109) of discharging the front end of the medium to a portion upstream of the pair of transport rollers 3 by rotating the transport motor 30 in the reverse direction.

Note that as described while referring to FIG. 20, the one-way clutch 54 is interposed between the transport motor 30 and the auxiliary roller 16; accordingly, when switching the rotation direction of the transport motor 30, due to the backlash of the gear constituting the one-way clutch 54, the auxiliary roller 16 does not start rotating immediately and there is a little time lag. Due to such a time lag, in step S109, at the initial stage when the transport motor 30 starts to rotate in the reverse direction, there is a period in which the transport driving roller 3*a* rotates in the reverse direction while the auxiliary roller 16 is in a stopped state.

Note that the time lag described above is not constant and has a character of easily changing its length each time depending on the meshed state of the gears. Such a time lag occurs in step S106 and at the initial stage when the transport motor 30 starts to rotate in the normal direction. During the above, when the front end of the medium passes the medium detection sensor 56 and proceeds downstream, due to the time lag described above, there will be an inconsistency in the position of the front end of the medium during step S109 or when performing the skew correction. In other words, there will be an error between the position of the front end of the medium identified by the control unit 50 and the actual position of the front end of the medium. With the above, when performing the skew correction, there will be an inconsistency in the amount of flexure between the auxiliary roller 16 and the pair of transport rollers 3, and an appropriate skew correction may not be performed.

However, as described above, since the front end of the medium has not reached the medium detection sensor 56 at the point of starting step S106, the front end of the medium can reach a portion downstream of the pair of transport rollers 3 while in a state in which the positional inconsistency is suppressed. As a result, in step S109 or when skew correction is performed, an inconsistency in the amount of flexure of the medium between the auxiliary roller 16 and the pair of transport rollers 3 can be suppressed and an appropriate skew correction can be performed.

Additionally, when there is an error between the position of the front end of the medium identified by the control unit 50 and the actual position of the front end of the medium after the front end of the medium has passed the medium detection sensor 56, the medium can be fed back and the front end of the medium can be detected once more with the medium detection sensor 56 to correct the error. In such a case, due to feeding back the medium, damage and wrinkles may be created in the medium and jamming may occur; however, such shortcomings does not occur in the present exemplary embodiment.

Note that in the present exemplary embodiment, as illustrated in FIG. 19, a first pressing member 47 that presses the separating roller 13 towards the feed roller 12, and a second pressing member 48 that presses the driven roller 17 towards auxiliary roller 16 are separate members. In the present exemplary embodiment, the first pressing member 47 and the second pressing member 48 are coil compression springs. Note that the separating roller 13 is provided so as to be advanceable/retractable relative to the feed roller 12. The driven roller 17 is also provided so as to be advanceable/retractable relative to the auxiliary roller 16.

With the above configuration, even when the pressing force of the second pressing member 48 is increased and the transporting force is increased, the force nipping the medium between the feed roller 12 and the separating roller 13 does not become large, and multi feeding can be suppressed. In other words, suppressing of multi feeding with the separating roller 13 and reliable transportation of the medium with the auxiliary roller 16 can both be achieved.

Note that the present disclosure is not limited to the exemplary embodiments described above and various modifications can be made within the scope of the disclosure stated in the claims, which are, naturally, also included in the scope of the present disclosure.

What is claimed is:

1. A recording apparatus comprising:

a recording head that performs recording;

a transport roller that transports a medium towards an opposing position that opposes the recording head;

an inversion path provided on a side opposite the recording head with respect to the transport roller, the inversion path inverting the medium;

a feed roller that feeds out a set medium; and an auxiliary roller provided between the inversion path and the transport roller, the auxiliary roller assisting the transportation of the medium, wherein when the apparatus is seen from a side of the apparatus, the auxiliary roller, in a height direction of the apparatus, overlaps a center position of the inversion path in the height direction, the transport roller transports the medium, which is fed out by the feed roller, towards the opposing position, the auxiliary roller is provided between the feed roller and the transport roller, and when the apparatus is seen from the side of the apparatus, the auxiliary roller overlaps the feed roller in the height direction.

2. The recording apparatus according to claim 1, further comprising:

an inverting roller provided inside the inversion path, the inverting roller rotating to move the medium in the inversion path, wherein a position of a rotation shaft of the inverting roller is a center position of the inversion path.

3. The recording apparatus according to claim 1, wherein when the apparatus is seen from the side of the apparatus, the auxiliary roller overlaps the feed roller in a depth direction of the apparatus.

4. The recording apparatus according to claim 1, wherein when the apparatus is seen from a front of the apparatus, the auxiliary roller overlaps the feed roller in an axial direction of a rotation shaft of the transport roller.

5. The recording apparatus according to claim 1, further comprising:

a nip portion that nips the medium together with the feed roller;

a pair of transport rollers that transports the medium, which is fed out by the feed roller, towards an opposing position that opposes the recording head; wherein the recording head performs recording on the medium, wherein the auxiliary roller provided between the feed roller and the pair of transport rollers, wherein when the apparatus is seen from a side of the apparatus, the auxiliary roller overlaps the feed roller in a depth direction of the apparatus, and a maximum value Lmax of a feeding length of the medium fed by the feed roller is less than a path length L3 that is a sum of a path length L1 from a first nip position at which the medium is nipped by the feed roller and the nip portion to a second nip position at which the medium is nipped by the pair of transport rollers, and a path length L2 from the second nip position to a most upstream position in a transport direction in a recordable range of the recording head.

6. The recording apparatus according to claim 5, further comprising:

a medium detection member that detects the passage of the medium and that is provided between the auxiliary roller and the pair of transport rollers, wherein the maximum value Lmax is less than a path length L4 from the first nip position to a position at which the medium detection member detects the medium.

7. The recording apparatus according to claim 6, further comprising:

a transport motor that is configured to generate driving force of the feed roller, the auxiliary roller and a transport driving roller that is a driving roller of the pair of the transport rollers;

a planetary gear mechanism that is provided in a transmission path of the driving force from the transport motor to the feed roller; and a rotation restricting member that is provided in a transmission path of the driving force from the transport motor to the auxiliary roller and that restricts rotation of the auxiliary roller, wherein with rotation of the transport motor in a normal direction, the transport driving roller rotates and feeds out the medium downstream in the transport direction, and with rotation of the transport motor in a reverse direction, the transport driving roller rotates and feeds out the medium upstream in the transport direction, wherein the planetary gear mechanism is configured to switch between transmitting the driving force to the feed roller when the transport motor is rotating in the reverse direction and not transmitting the driving force of the transport motor when the transport motor is rotating in the normal direction, wherein with the rotation of the transport motor in the reverse direction, the feed roller rotates and feeds out the medium downstream in the transport direction, and wherein with the rotation of the transport motor in the normal direction, the auxiliary roller rotates and feeds out the medium downstream in the transport direction and, with the rotation of the transport motor in the reverse direction, the auxiliary roller does not rotate.

8. The recording apparatus according to claim 7, further comprising:

a control member that controls the transport motor, wherein the control member is configured to perform a feeding mode including, a step of feeding a set medium with the feed roller by rotating the transport motor in the reverse direction, a step of nipping a front end of the medium between the pair of transport rollers by rotating the transport motor in the normal direction, and a step of discharging the front end of the medium upstream of the pair of transport rollers in the transport direction.

9. The recording apparatus according to claim 5, further comprising:

a driven roller that nips the medium together with the auxiliary roller;

a first pressing member that presses the nip portion towards the feed roller; and a second pressing member that presses the driven roller towards the auxiliary roller, the second pressing member being a member separate from the first pressing member.

10. The recording apparatus according to claim 6, further comprising:

a driven roller that nips the medium together with the auxiliary roller;

a first pressing member that presses the nip portion towards the feed roller; and a second pressing member that presses the driven roller towards the auxiliary roller, the second pressing member being a member separate from the first pressing member.

* * * * *